(12) United States Patent
Drachmann

(10) Patent No.: US 10,416,012 B2
(45) Date of Patent: Sep. 17, 2019

(54) ULTRASONIC FLOW METER

(75) Inventor: Jens Drachmann, Viby J (DK)

(73) Assignee: Apator Miitors ApS, Aarhus V (DK)

( * ) Notice: Subject to any disclaimer, the term of this patent is extended or adjusted under 35 U.S.C. 154(b) by 1214 days.

(21) Appl. No.: 14/351,765

(22) PCT Filed: Sep. 7, 2012

(86) PCT No.: PCT/DK2012/050333
§ 371 (c)(1),
(2), (4) Date: Apr. 14, 2014

(87) PCT Pub. No.: WO2013/053360
PCT Pub. Date: Apr. 18, 2013

(65) Prior Publication Data
US 2014/0236533 A1     Aug. 21, 2014

(30) Foreign Application Priority Data

Oct. 13, 2011  (EP) .................................... 11184989

(51) Int. Cl.
G01F 1/66        (2006.01)
(52) U.S. Cl.
CPC .............. G01F 1/662 (2013.01); G01F 1/667 (2013.01); G01F 1/668 (2013.01)
(58) Field of Classification Search
None
See application file for complete search history.

(56) References Cited

U.S. PATENT DOCUMENTS

| | | | | | |
|---|---|---|---|---|---|
| 3,818,757 | A | * | 6/1974 | Brown | G01F 1/667 73/861.28 |
| 3,935,735 | A | * | 2/1976 | Lee | G01F 1/667 73/861.29 |
| 4,183,244 | A | * | 1/1980 | Kohno | G01F 1/667 73/861.26 |
| 4,227,407 | A | * | 10/1980 | Drost | A61B 5/0275 73/861.28 |
| 4,545,244 | A | * | 10/1985 | Yasuda | G01F 1/66 73/195 |

(Continued)

FOREIGN PATENT DOCUMENTS

| | | |
|---|---|---|
| CN | 101248331 A | 8/2008 |
| DE | 19613311 A1 | 10/1997 |

(Continued)

OTHER PUBLICATIONS

International Search Report Application No. PCT/DK2012/050333 Completed: Feb. 12, 2013; dated Apr. 19, 2013 4 pages.

*Primary Examiner* — Gregory J Toatley, Jr.
*Assistant Examiner* — Brandon J Becker
(74) *Attorney, Agent, or Firm* — Lee & Hayes, P.C.

(57) ABSTRACT

A method for estimating and correcting or at least reducing phase errors in received ultrasonic signals in an ultrasonic flow meter is disclosed, the method including the steps of: measuring one or more signals in the ultrasonic flow meter, which one or more signals depend on characteristics of one or more ultrasonic transducers in the ultrasonic flow meter, using the one or more measured signals for calculating an estimated phase error value, and using the estimated phase error value for correcting transmission times measured by the ultrasonic flow meter.

20 Claims, 22 Drawing Sheets

(56) References Cited

U.S. PATENT DOCUMENTS

| | | | |
|---|---|---|---|
| 5,111,825 A | 5/1992 | Nishiyama et al. | |
| 5,178,018 A * | 1/1993 | Gill | G01F 1/667 |
| | | | 73/596 |
| 5,675,259 A | 10/1997 | Arndt | |
| 6,539,316 B1 * | 3/2003 | Doten | A61B 8/06 |
| | | | 702/33 |
| 6,829,948 B2 | 12/2004 | Nakabayashi et al. | |
| 2003/0200817 A1 * | 10/2003 | Suginouchi | G01F 1/667 |
| | | | 73/861.23 |
| 2003/0209083 A1 | 11/2003 | Nakabayashi et al. | |
| 2007/0084286 A1 * | 4/2007 | Ajay | G01F 1/667 |
| | | | 73/597 |
| 2008/0250870 A1 * | 10/2008 | Rhodes | G01F 1/66 |
| | | | 73/861.27 |
| 2009/0000392 A1 * | 1/2009 | Zhou | G01F 1/667 |
| | | | 73/861.18 |
| 2009/0019945 A1 * | 1/2009 | Matsushita | G01F 1/667 |
| | | | 73/861.28 |
| 2010/0268486 A1 * | 10/2010 | Takeda | G01F 1/662 |
| | | | 702/48 |
| 2012/0046765 A1 * | 2/2012 | Nikolic | B06B 1/0253 |
| | | | 700/90 |

FOREIGN PATENT DOCUMENTS

| | | |
|---|---|---|
| EP | 0846936 A1 | 6/1998 |
| EP | 1361417 A2 | 11/2003 |
| GB | 2017914 A | 10/1979 |
| WO | 03036240 A1 | 5/2003 |

\* cited by examiner

ULTRASONIC FLOW METER

FIELD OF THE INVENTION

The present invention relates to an ultrasonic flow meter for measuring the flow of a fluid, in particular within the field of transit time flow metering.

BACKGROUND OF THE INVENTION

Generally speaking, flow metering by means of the transit time method includes placing two ultrasonic transducers with a suitable mutual distance in the flow path in which the flow of a fluid is to be measured. An ultrasound signal, typically of a frequency of a few megahertz and a duration of a few microseconds, is transmitted through the fluid from the first transducer to the second transducer, and a first transmit time is recorded. Next, a similar ultrasound signal is transmitted through the fluid in the opposite direction, i.e. from the second transducer to the first transducer, and a second transmit time is recorded. Knowing the physical distance between the two transducers, the difference between the two recorded transmit times can be used for calculating the flow rate of the fluid flowing in the flow path. However, the calculated flow rate must be corrected by means of a correction table taking into account the sound velocity and viscosity of the fluid. Both of those characteristics being dependent on the temperature, a correction table with correction values depending on the temperature is sufficient when the type of fluid is known.

One problem to be faced when working with this type of flow meters is that the transducer parameters are not only very likely to differ between samples but also change over time and when the temperature changes. Such differences and changes alter the shape of the received signal, making it difficult to use this shape as basis for the calculation of the absolute transit time.

During the last 25 years, ultrasonic flow metering has seen a dramatic development from low volume laboratory instruments to standard equipment produced in very high volume. Technical and commercial challenges have been overcome to a degree that the technology is now competitive against most other methods including mechanical meters in many areas of flow metering. For instance, highly accurate flow meters produced in high volumes are now commonly used as water meters, heat meters, gas meters and other meters used for billing.

Some of the challenges still to be worked on are improving the meters so that they are less sensitive to electrical and acoustical noise while still keeping the meters stable and producible and without sacrificing cost and power consumption. Sensitivity to noise can be decreased by increasing the signal to noise ratio, the most effective method being increasing the signal.

Typical acoustical noise sources in an ultrasonic flow meter are edges in the flow current and external vibrations, both producing a fixed acoustical noise level independent of the ultrasound generated by the meter itself. The sensitivity to the acoustical noise can be reduced by increasing the acoustical signal produced by the transducers or by changing the physical shape of the flow meter.

Electrical noise in an ultrasonic flow meter has many sources, such as thermal noise, externally induced (by electromagnetic, electric or magnetic fields or by wire) voltages and currents, or internally induced (from other signals or clocks in the electric circuit) cross coupling, some of which are signal level dependent and some of which are independent of the signal level. The most effective way to reduce the sensitivity to electrical noise is by increasing the electrical signals involved and by keeping impedances of electrical nodes as low as possible in order to reduce the influence of the sources of electrical noise.

Many different electrical circuits relating to these subjects are known in the art, such as GB 2 017 914 (Hemp), U.S. Pat. No. 4,227,407 (Drost), DE 196 13 311 (Gaugler), U.S. Pat. No. 6,829,948 (Nakabayashi), EP 0 846 936 (Tonnes) and EP 1 438 551 (Jespersen), each having strengths and weaknesses.

The two last-mentioned documents (Tonnes and Jespersen) show transducer couplings having the benefit that the impedance as seen from the transducers is the same in the transmit situation and in the receive situation. Discussions in the two patent documents explain that this feature is a prerequisite for the whole flow meter to demonstrate stability and producibility in real life situations, i.e. without unrealistic requirements on matching between components in the meter. The reason for this fact is that the exact impedance match allows the flow meter to fully exploit the reciprocity theorem.

Although the connection between reciprocity and stable flow metering has been known for many years, the couplings shown in these patent documents are the only practical ways, known to date, that fully achieve absorbing the natural tolerances of piezoelectric ultrasonic transducers so that producible and stable flow meters can be produced.

The transducer couplings shown in both of these two documents comprise an impedance, which has the function of converting the current signal received from the transducer to a measurable voltage signal. Unfortunately, as explained in further detail below, this impedance also limits the electrical signal that can be supplied to the transducers, and in order to produce in the largest possible received voltage signal, the size of the impedance is restricted to be in the range between 0.5 and 2 times the impedance of the ultrasonic transducers at the frequency of interest.

Nakabayashi (U.S. Pat. No. 6,829,948) has another approach, in which the generator and the receiver are implemented by two different means, but in this configuration, the received signal strength is sacrificed for stable results at changing transducer parameters.

BRIEF DESCRIPTION OF THE INVENTION

It is an object of the present invention, which is described in the following, to overcome the above-identified problems and to provide a stable, producible flow meter, which is capable of transmitting a high acoustical signal.

The present invention relates to a method for estimating and correcting or at least reducing phase errors in received ultrasonic signals in an ultrasonic flow meter, said method comprising the steps of: measuring one or more signals in the ultrasonic flow meter, which one or more signals depend on characteristics of one or more ultrasonic transducers in the ultrasonic flow meter, using the one or more measured signals for calculating an estimated phase error value, and using the estimated phase error value for correcting transmission times measured by the ultrasonic flow meter.

Such a method allows for a fast and reliable phase error correction without unnecessary measurements and calculations during normal use of ultrasound flow meters.

In an embodiment of the invention, the ultrasonic flow meter includes means for measuring one or more power supply currents to an active component of a signal generator, and the one or more measured signals depending on characteristics of one or more ultrasonic transducers in the ultrasonic flow meter are power supply currents to an active component of the signal generator.

Using the power supply currents for the phase error correction is advantageous in that they can be measured relatively easy and can also be used for other purposes as described further below.

In an embodiment of the invention, the calculation of the estimated phase error value includes the use of one or more phase error correction constants.

The use of generic phase error correction constants reduces the amount of calculation necessary to determine the estimated phase error value.

In an embodiment of the invention, the estimated phase error value is calculated from the expression $\Im(C)*\Re(I_2'-I_1')+\Re(C)*\Im(I_2'-I_1')+C3$, wherein $I_1'$ and $I_2'$ are measured power supply currents to an active component of a signal generator of the ultrasonic flow meter, when an ultrasonic signal is transmitted in a first and a second direction between two ultrasonic transducers, respectively, $\Re$ and $\Im$ are operators representing the real and imaginary parts, respectively, of a complex value, and C and C3 are complex value phase error correction constants.

This specific expression has proven to be very useful for calculating estimated phase error values, as the use of phase error values calculated using this expression has shown to result in phase error reductions of at least a factor of about 10.

In an embodiment of the invention, the one or more phase error correction constants are determined and optimized to result in the best possible estimated phase error values over a large range of temperatures through a series of measurements of actual phase errors in an ultrasonic flow meter so that the one or more phase error correction constants may be considered independent of temperature when calculating the estimated phase error value.

In this way, the phase error correction takes into account the fact that the characteristics of ultrasonic transducers change with temperature. Furthermore, the same constant values has shown to be valid for a large number of ultrasonic flow meters, whose active components stem from the same production batches and therefore have very similar characteristics.

In an embodiment of the invention, the steps of regularly repeating the measurement of the one or more signals depending on characteristics of characteristics of one or more ultrasonic transducers in the ultrasonic flow meter and updating the calculation of the estimated phase error value accordingly.

In this way, the phase error correction takes into account the fact that the characteristics of ultrasonic transducers change over time without having to perform any special tests on the ultrasonic flow meter.

In an aspect of the invention, it relates to a method for determining the absolute transit time of an ultrasonic signal in a flow path of an ultrasonic flow meter comprising two ultrasonic transducers, said method comprising the steps of:

monitoring a current to an active component of a signal generator driving a transducer from one or more voltage supplies during and after a feeding of an input signal to the signal generator, thus obtaining a supply current signal for the transducer, emulating a flow meter response similar to an output signal from a receiver circuit of the flow meter as the output signal would be, if there was no time delay in the transmission of an ultrasonic signal between the two ultrasonic transducers, comparing the emulated flow meter response to a measured flow meter response actually received by the receiver circuit, and calculating the absolute transit time as the time difference between the emulated flow meter response and the measured flow meter response.

Such a method has shown to be efficient and result in very precise determination of the absolute transit time as compared to previously known methods.

In an embodiment of the invention, the step of emulating a flow meter response comprises:

feeding a single pulse input signal to a signal generator driving a transducer, said signal generator comprising an active component, monitoring the current to the active component from one or more voltage supplies during and after the feeding of the input signal to the signal generator, thus obtaining a single pulse supply current signal for the transducer, adjusting the single pulse supply current signal and for obtaining an emulated single pulse response of the transducer, repeating the three previous steps for the other transducer, thus obtaining another emulated single pulse response, finding the single pulse response of the system by making a convolution of the two obtained single pulse responses of the transducers, and calculating the emulated flow meter response by combining a number of instances of the found single pulse response of the system, which are repeated with suitable delays.

This has shown to be an efficient way of obtaining emulated flow meter responses very similar to the measured flow meter responses.

In an embodiment of the invention, the step of emulating a flow meter response comprises:

feeding a pulsating input signal to a signal generator driving a transducer, said signal generator comprising an active component, monitoring the current to the active component from one or more voltage supplies during and after the feeding of the input signal to the signal generator, thus obtaining one or more supply current signal, determining directly from the obtained one or more supply current signal or from one or more resulting signals derived from the one or more obtained supply current signal one or more quantities useful for characterizing the transducer, repeating the three previous steps for the other transducer, thus obtaining similar quantities useful for characterizing the other transducer, using the determined characteristic quantities of the transducers for finding an equivalence model of the transducers and establishing a numerical simulation model of the transducers and electronic circuits of a signal generator and/or a receiver circuit of the flow meter, and simulating the flow meter system by entering an input signal function or a sampled version of a physical transmission signal reaching the first transducer into the numerical simulation model, thereby obtaining the emulated flow meter response.

This is another efficient way of obtaining emulated flow meter responses very similar to the measured flow meter responses.

In an embodiment of the invention, the quantities useful for characterizing the transducer include an oscillation period and/or a damping coefficient determined from at least a part of one or more of the obtained signals and/or the derived signals, said signal part representing a dampened oscillation.

The oscillation period and the damping coefficient relating to a dampened oscillation of the transducer are very useful characteristics of the transducers, which are very suitable for constructing an adequate equivalence model of the transducers.

In an embodiment of the invention, the one or more supply current signals are obtained by monitoring the voltage across one or more current sensing resistors being arranged in series between the active component of the signal generator and one or more voltage supplies of the signal generator.

This is a simple, stable and well-known method for measuring a current signal.

In an embodiment of the invention, the step of calculating the absolute transit time comprises:
  transforming the emulated flow meter response and the measured flow meter response into the frequency domain, for instance by means of Fast Fourier Transformation,
  determining the phase angle between the two flow meter responses in the frequency domain at at least two different frequencies, and
  determining the absolute transit time by calculating the group time delay from the two determined phase angles.

The use of Fast Fourier Transformation and working in the frequency domain substantially reduces the amount of calculation needed to determine the absolute transit time.

In an embodiment of the invention, the step of calculating the absolute transit time comprises:
  finding filtered envelopes of the emulated flow meter response and the measured flow meter response, respectively,
  identifying the two points in time, in which the filtered envelopes have reached 50% of their maximum value, respectively, and
  calculating the absolute transit time as the time difference between the two identified points in time.

This method has shown to provide a very precise determination of the absolute transit time of the ultrasonic signal passing through the flow path of the flow meter.

In an aspect of the invention, it relates to an ultrasonic flow meter comprising at least one ultrasonic transducer and a signal generator for generating electrical signals to the transducer, the signal generator comprising an active component, wherein the flow meter further includes means for measuring one or more power supply currents to the active component of the signal generator.

This enables for the possibility of characterising the transducers while they are arranged in the flow meter.

In an embodiment of the invention, the means for measuring one or more power supply currents comprise a resistor inserted in series between the source of the positive supply voltage and the active component.

This is a simple, stable and well-known method for measuring a current signal.

In an embodiment of the invention, the means for measuring one or more power supply currents comprise a resistor inserted in series between the source of the negative supply voltage and the active component.

Measuring the supply currents in both power supply connections enables for a faster characterization of the transducers, measuring two supply current signals simultaneously.

In an aspect of the invention, it relates to a method for characterizing an ultrasonic transducer, said method comprising the steps of:
  feeding a pulsating input signal to a signal generator driving the transducer, said signal generator comprising an active component,
  monitoring the current to the active component from one or more voltage supplies during and after the feeding of the input signal to the signal generator, thus obtaining one or more supply current signal, and
  determining directly from the obtained one or more supply current signal or from one or more resulting signals derived from the one or more obtained supply current signal one or more quantities useful for characterizing the transducer.

This method enables for characterization of the transducers while they are arranged in the flow meter.

In an embodiment of the invention, the active component is an operational amplifier.

In another embodiment of the invention, the active component is a digital circuit driving the transducer.

This reflects that different types of active components can be used in the signal generator.

In an embodiment of the invention, the one or more supply current signals are obtained by monitoring the voltage across one or more current sensing resistors being arranged in series between the active component of the signal generator and one or more voltage supplies of the signal generator.

This is a simple, stable and well-known method for measuring a current signal.

In an embodiment of the invention, the quantities useful for characterizing the transducer include an oscillation period and/or a damping coefficient determined from at least a part of one or more of the obtained signals and/or the derived signals, said signal part representing a dampened oscillation.

The oscillation period and the damping coefficient relating to a dampened oscillation of the transducer are very useful characteristics of the transducers, which are very suitable for constructing an adequate equivalence model of the transducers.

In an of the invention, it relates to a method for determining the time delay of the ultrasonic signal in the flow path of an ultrasonic flow meter, said method comprising the steps of:
  characterizing two transducers of the flow meter by determining characteristic quantities, such as the angular frequency and the damping coefficient of dampened oscillations of the transducers,
  using the determined characteristic quantities of the transducers for finding an equivalence model of the transducers and establishing a numerical simulation model of the transducers and electronic circuits of a signal generator and/or a receiver circuit of the flow meter,
  simulating the flow meter system by entering an input signal function or a sampled version of a physical transmission signal reaching the first transducer into the numerical simulation model, thereby obtaining a simulation model response corresponding to the output signal from the receiver circuit as it would be according to the model, if there was no time delay in the transmission of the ultrasonic signal between the two transducers,
  recording the physical flow meter response actually received by the receiver circuit, and calculating the absolute transit time by determining the time delay of the physical flow meter response as compared to the simulation model response.

This method has shown to provide a very precise determination of the absolute transit time of the ultrasonic signal passing through the flow path of the flow meter.

In an embodiment of the invention, the step of calculating the absolute transit time comprises the steps of:
finding filtered envelopes of the simulation model response and the physical flow meter response, respectively,
identifying the two points in time, in which the filtered envelopes have reached 50% of their maximum value, respectively, and
calculating the absolute transit time as the time difference between the two identified points in time.

This method of calculating the absolute transit time has shown to be very precise and reproducible, taking into account that the transducer parameters not only are very likely to differ between samples but also change over time and when the temperature changes.

In an aspect of the invention, it relates to an ultrasonic flow meter comprising at least one ultrasonic transducer and a signal processing unit for processing electrical signals received from the at least one ultrasonic transducer, wherein the signal processing unit is arranged to digitalize a continuous signal at a sample frequency of less than twice the resonance frequency of the at least one ultrasonic transducer.

This allows for the use of slower and cheaper analogue-digital converters in the flow meter than would otherwise be needed.

In an aspect of the invention, it relates to an ultrasonic flow meter comprising a flow path for fluid flow, at least two ultrasonic transducers acoustically coupled to the flow path, the one transducer arranged upstream of the other transducer along the flow path, a signal generator for generating electrical transmission signals to the transducers, the signal generator comprising a negative feedback coupled operational amplifier, a receiver circuit for receiving electrical reception signals from the transducers, the receiver circuit comprising a negative feedback coupled operational amplifier, a switching unit for switching electrical transmission signals between the signal generator and the transducers and for switching electrical reception signal between the transducers and the receiver circuit, a signal processing unit for providing an output indicative of the flow rate in the flow path based on the electrical reception signals, wherein the switching unit is coupled to an output terminal of the operational amplifier of the signal generator and the switching unit is coupled to an inverting input terminal of the operational amplifier of the receiver circuit.

Thus, the invention relates especially to high accuracy, high volume, low power and low cost consumption meters for billing purposes.

By coupling the switching unit, and thereby the transducers, to the output terminal of an operational amplifier of the signal generator and to the inverting input terminal of the operational amplifier of the receiver circuit, it is achieved that the impedance as seen from the transducers is the same regardless of whether the transducers are operated as transmitters or as receivers. This means that the reciprocity theorem for linear passive circuits applies for the flow meter, which is important for its stability and producibility.

In an embodiment of the invention, an output impedance of the signal generator and an input impedance of the receiver circuit are negligible compared to the impedance of the transducers, such as less than 10 Ohms, preferably less than 1 Ohm, most preferred less than 0.1 Ohm.

Choosing a very low output impedance of the signal generator SG and a very low input resistance of the receiver circuit RC is advantageous for obtaining that the transducers will experience the two impedances as being sufficiently close to each other, and for assuring that the attenuation of the electrical transmission and reception signals is minimized.

In an embodiment of the invention, the signal generator and the receiver circuit share at least one active component.

This is advantageous for saving component costs when producing the flow meter.

In an embodiment of the invention, all active components of the signal generator are completely separate from all active components of the receiver circuit.

Using different active components for the signal generator and for the receiver circuit enables for the possibility that the signal can be transmitted all the way through the flow meter without any switching over of the transmission path having to take place during the transmission.

In an embodiment of the invention, one or more of the operational amplifiers in the signal generator and the receiver circuit are current feedback operational amplifiers.

The use of current feedback amplifiers is beneficial, because such amplifiers have a lower input impedance on the inverting input terminal and a higher bandwidth and a lower power consumption and a higher gain at high frequencies than other types of operational amplifiers.

In an embodiment of the invention, one or more of the operational amplifiers in the signal generator and the receiver circuit are operated at an input common mode voltage, the AC component of which is substantially zero or at least negligible.

This is of importance for some types of operational amplifiers, especially the fastest ones with the highest bandwidth and very low current consumption, as the voltage swing allowed on the input for linear operation can be very limited.

In an embodiment of the invention, the at least two transducers are arranged to be able to transmit an ultrasound signal simultaneously.

In this configuration, the electrical transmission signal is only to be sent half as many times as in other configurations, saving battery life time. In addition, the transit time is measured simultaneously in the two directions and, thus, no sudden change of the flow velocity between measurements in the two directions can occur.

THE DRAWINGS

In the following, a few exemplary embodiments of the invention are described and explained in more detail with reference to the drawings, where FIG. 1 illustrates schematically the overall structure of an ultrasonic flow meter for transit time flow metering as known in the art, FIG. 2a illustrates schematically a coupling of ultrasonic transducers in an ultrasonic flow meter known in the art, FIG. 2b illustrates schematically a coupling of ultrasonic transducers in another ultrasonic flow meter known in the art, FIG. 3 illustrates schematically a coupling of ultrasonic transducers in an ultrasonic flow meter according to an embodiment of the invention, FIG. 4 illustrates schematically a coupling of ultrasonic transducers in an ultrasonic flow meter according to another embodiment of the invention, FIG. 5 illustrates schematically a coupling of ultrasonic transducers in an ultrasonic flow meter according to yet another embodiment of the invention, FIG. 6 shows a diagram of most of the essential electronic components in an ultrasonic flow meter according to an embodiment of the invention, FIG. 7a illustrates schematically a set-up for performing a first step in obtaining a supply current signal of an active component driving an ultrasonic transducer, FIG. 7b illustrates schematically a set-up for performing a second step in obtaining a supply current signal of an active component driving an ultrasonic transducer, FIG. 8a illustrates schematically a first step in obtaining characteristics of an ultrasonic transducer from supply current signals of an active component driving the transducer, FIG. 8b illustrates schematically a second step in obtaining characteristics of an ultrasonic transducer from supply current signals of an active component driving the transducer, FIG. 9 illustrates a well-known equivalence diagram of an ultrasonic transducer, FIG. 10 illustrates some of the steps in the derivation of a simple equivalence diagram of an ultrasound flow meter according to the invention, FIG. 11 illustrates the differences and similarities between a physical and a simulated signal chain through a flow meter according to the invention, FIG. 12 illustrates schematically a method according to the invention for determining very precisely the time delay of the ultrasonic signal in the flow path, FIG. 13 illustrates schematically in more detail a method for calculation of the absolute transit time from response signals obtained by a method as the one illustrated in FIG. 12, FIG. 14a illustrates an example of the frequency spectrum of a continuous signal, FIG. 14b illustrates schematically the spectral consequences of undersampling the continuous signal, whose frequency spectrum is illustrated in FIG. 14a, FIG. 14c illustrates schematically how the undersampled signal can be reconstructed by changing the sampling frequency and filtering the signal, FIG. 15a illustrates an example of a continuous signal, FIG. 15b illustrates the digital samples obtained by sampling the signal of FIG. 15a at a sampling frequency of 5/6 of the signal frequency, FIG. 16a illustrates the reconstruction of the signal of FIG. 15a using a wide band FIR reconstruction filter, FIG. 16b illustrates the reconstruction of the same signal using a narrow band FIR reconstruction filter, FIG. 17 illustrates schematically a method for finding the amplitude and phase of an undersampled continuous signal, FIG. 18 illustrates schematically a method for reconstructing an undersampled continuous signal without distortion, FIG. 19 illustrates schematically an extended method according to the invention for determining very precisely the time delay of the ultrasonic signal in the flow path, FIG. 20a illustrates a schematic diagram of the electrical currents running in an ultrasonic flow meter according to an embodiment of the invention, when an ultrasonic signal is transmitted in a first signal direction from a first ultrasonic transducer to a second ultrasonic transducer, FIG. 20b illustrates a schematic diagram of the electrical currents running in the same ultrasonic flow meter, when an ultrasonic signal is transmitted in a second signal direction from the second ultrasonic transducer to the first ultrasonic transducer, and FIG. 20c illustrates a schematic diagram of the electrical currents running in a test setup for determining certain parameters in an ultrasonic flow meter according to the invention.

DETAILED DESCRIPTION

FIG. 1 shows the overall structure of an ultrasonic flow meter for transit time flow metering as known in the art. A controller unit CU controls the operation of a signal generator SG, a switching unit SU and a receiver circuit RC, where the switching unit SU sets up different electrical connections between the signal generator SG and the receiver circuit RC on one side and two ultrasonic transducers TR1, TR2 on the other side. The two transducers TR1, TR2 are arranged in a flow path, in which a fluid flow is to be metered, one transducer TR1 upstream of the other transducer TR2 along the flow path.

In principle, the flow metering is performed in three steps:
1. The switching unit SU is set up to connect the signal generator SG to the first transducer TR1 and to connect the second transducer TR2 to the receiver circuit RC.
   An electrical transmission signal, typically a pulsating signal of a frequency of a few megahertz and duration of a few microseconds, is sent from the signal generator SG through the switching unit SU to the first transducer TR1, from which the signal is transmitted as an ultrasonic signal through the fluid to the second transducer TR2. From TR2, the signal continues as an electrical current reception signal through the switching unit SU to the receiver circuit RC, in which the reception signal is converted to a voltage signal.
   A signal processing unit (part of the controller unit CU in the configuration shown in FIG. 1), analyses the voltage signal, calculates the transit time of the ultrasound signal through the fluid from transducer TR1 to transducer TR2 from the delay of the electrical reception signal as compared to the electrical transmission signal, and records this transit time ($t_1$).
2. The configuration of the switching unit SU is changed to connect the signal generator SG to the second transducer TR2 and to connect the first transducer TR1 to the receiver circuit RC.
   An electrical transmission signal is sent from the signal generator SG and an electrical reception signal is received by the receiver circuit RC as in step 1, only this time the ultrasonic signal is transmitted through the fluid in the opposite direction, i.e. from the second transducer TR2 to the first transducer TR1.
   Again, the signal processing unit calculates and records the transit time ($t_2$).
3. The signal processing unit calculates an indication of the flow in the flow path from a formula of the form:

$$\Phi \propto K(t_1 - t_2, t_1 + t_2) \cdot \frac{t_1 - t_2}{(t_1 + t_2)^2} \quad \text{(Equation 1)}$$

where $\Phi$ is the flow indication, which is proportional to the fraction shown in Equation 1 multiplied by a correction factor K found in a table of correction factors, which is determined once and for all for a given type of flow meter for a given fluid.

This table of correction factors takes into account a number of physical quantities, such as, for instance, the dimensions and physical configuration of the flow path in the flow meter and the viscosity of the fluid.

As can be seen from Equation 1, once the table of correction factors has been established, the flow indication can be calculated from the two quantities $(t_1-t_2)$ and $(t_1+t_2)$.

The first of these quantities, $(t_1-t_2)$, which is the difference between the two transit times, is typically in the order of a few nanoseconds, but can easily be determined by finding the phase difference between the two reception signals. This can be done very precisely (with an accuracy of down to between 10 and 100 picoseconds) by several analogue and digital methods well-known through many years, due to the fact that the two reception signals are identical except from a phase difference due to the different transit times ($t_1$ and $t_2$), given that the reciprocity theorem for linear passive circuits applies. Generally, this is the case if it is assured that the impedance, as seen from the transducers TR1, TR2 is the same, regardless of whether the transducers TR1, TR2 are acting as transmitters or receivers of ultrasound.

On the other hand, it is very difficult to calculate accurately the other quantity, $(t_1+t_2)$, which is the sum of the two transit times, typically in the order of a few microseconds, because it involves a calculation of the exact transit times ($t_1$ and $t_2$), which again requires a very precise determination of the front edge of each of the reception signals, which is by no means a simple task due to the shape of the reception signals.

Therefore, in many known flow meters, this quantity is, in fact, not calculated. Instead, it is estimated using the following equation:

$$\frac{d}{c} = t \approx t_1 \approx t_2 \qquad \text{(Equation 2)}$$

In this equation, d is the distance between the two transducers TR1, TR2 and c is the velocity of ultrasound in the actual fluid, the flow of which is being metered. For a given flow meter, d is known from the physical positions of the transducers TR1, TR2 in the flow path, and, for a given temperature, the velocity of ultrasound in a given fluid can be found in a table. Thus, by measuring the temperature of the fluid, an estimate of $t_1$ and $t_2$ can be found, which can then be used for estimating the quantity $(t_1+t_2)$ to be used in Equation 1.

FIGS. 2a and 2b illustrate schematically examples of couplings of ultrasonic transducers in ultrasonic flow meters according to the inventions of Tonnes (EP 0 846 936) and Jespersen (EP 1 438 551), respectively.

Implemented correctly, both couplings assure that the reciprocity theorem for linear passive circuits applies.

In the coupling shown in FIG. 2a, the electrical transmission signal is transmitted from the signal generator SG to transducer TR1 through the signal impedance Zsig. In the coupling shown in FIG. 2b, on the other hand, the signal generator SG comprises a negative feedback coupled amplifier circuit, wherein a digital pulsating signal is connected to the non-inverting input terminal of an operational amplifier OPsg and the signal impedance Zsig forms a feedback between the output terminal and the inverting input of the operational amplifier OPsg. Transducer TR1 is connected to the inverting input terminal of the operational amplifier OPsg through an adaptation impedance Zad, which is much smaller than the signal impedance Zsig and therefore, in practice, negligible.

In both of the shown couplings, the switching unit SU comprises two switches SW1, SW2 arranged to be able to connect the two transducers TR1, TR2, respectively to a common conductor CC, which connects the signal generator SG to the receiver circuit RC. In both cases, the position of each of the switches SW1, SW2 has to be changed during the flow metering in order to assure that, at the time of transmission of the electrical transmission signal from the signal generator SG, one of the transducers TR1, TR2 is connected to the common conductor, whereas, at the time of reception of the electrical reception signal by the receiver circuit RC, the other transducer TR2, TR1 is connected to the common conductor CC. This change of switch positions must take place after the ultrasonic signal has left the transmitting transducer TR1, TR2, but before it reaches the receiving transducer TR2, TR1. Thus, the timing is very crucial.

The signal impedance Zsig through which the signal current will run in both of the couplings shown in FIGS. 2a and 2b has the function of converting the current signals received from the transducers TR2, TR1 to measurable voltage signals. The size of the voltage signals is found by multiplying the received currents by the signal impedance Zsig, a large signal impedance Zsig resulting in a large received voltage signal.

Unfortunately, due to practical limitations on the supply voltage to the signal generator SG, the signal impedance Zsig also limits the electrical signal that can be supplied to the transducers TR1, TR2, because the signal impedance Zsig is also present during the transmission of a signal to the transducers TR1, TR2. Thus, the output voltage from the signal generator SG has to be larger than the signal requested on the transducers TR1, TR2. The compromise resulting in the largest received voltage signal is a value of the signal impedance Zsig in the range between 0.5 and 2 times the impedance of the ultrasonic transducers TR1, TR2 at the frequency of interest.

The present invention, on the other hand, provides a stable, producible flow meter, which is capable of transmitting a high acoustical signal, at the same time amplifying the received current signal by a high signal impedance and having a low impedance at sensitive nodes in the circuitry.

The basic idea in the present invention is to connect the transducers TR1, TR2 to different nodes in the transmit and receive situation making sure that the reciprocity theorem for linear passive circuits still applies, i.e. without sacrificing the characteristic that the impedance as seen from the transducer TR1, TR2 is the same regardless of whether the transducer TR1, TR2 is operated as a transmitter or as a receiver.

This is achieved by coupling the switches SW1, SW2 of the switching unit SU to the output terminal of an operational amplifier OPsg of the signal generator SG and to the inverting input terminal of the operational amplifier OPrc of the receiver circuit RC as illustrated schematically in FIG. 3, which shows an embodiment of the present invention.

By using an operational amplifier OPsg with a very low output impedance in the signal generator SG and by choosing feedback components resulting in appropriate feedback impedances Zfb,sg, Zfb,rc for constructing negative feedback circuits for the two operational amplifiers OPsg, OPrc, respectively, it is possible to obtain a signal generator SG with a very low output impedance and a receiver circuit RC with a very low input impedance, at the same time accounting for the parasitic components of the operational amplifiers OPsg, OPrc. The very low impedances are obtained by coupling operational amplifiers with a very high gain at the frequency of interest with a negative feedback.

Choosing a very low output impedance of the signal generator SG and a very low input resistance of the receiver circuit RC is advantageous for at least four reasons:

First of all, if these impedances are both sufficiently low as compared to the impedances of the transducers TR1, TR2, and the parasitic components are accounted for, then, even though there may actually be a minimal difference between the output impedance of the signal generator SG and the input impedance of the receiver circuit RC, the transducers TR1, TR2 will experience the two impedances as being sufficiently close to each other. This means that, substantially, the reciprocity theorem for linear passive circuits applies, and the flow meter is stable and producible.

For a proper implementation, the output impedance of the signal generator SG and the input impedance of the receiver circuit RC should both be negligible compared to these transducer impedances, i.e. less than 1%, preferably less than 0.1%, of the transducer impedances. Depending on the transducer size and material and on the frequency of the transmitted signal, the transducer impedances at the frequencies of interest normally fall within the range from 100 Ohms to 1000 Ohms.

Secondly, the choice of small output and input impedances assures that the attenuation of the electrical transmission and reception signals is minimized, maximizing the output signal received by the receiver circuit RC.

Thirdly, very low impedances are chosen because mid-range values can be hard to match within negligible tolerances in different parts of the circuits, especially as it is the complex impedance and not just the absolute resistance value that has to be taken into account.

Fourthly, a low circuit impedance is less susceptible to interference from external noise sources.

An obvious advantage of the coupling shown in FIG. 3 is that by using two different operational amplifiers OPsg, OPrc in the signal generator SG and in the receiver circuit RC, respectively, no switching is necessary between the transmission and the reception of the ultrasonic signal between the two transducers TR1, TR2. When the switches SW1, SW2 are in the positions as shown in FIG. 3, the electrical transmission signal will pass from the signal generator SG through the second switch SW2 to the second transducer TR2, from which the ultrasonic signal will be transmitted to the first transducer TR1 through the flow path (not shown), whereupon the electrical reception signal will reach the receiver circuit RC from the first transducer TR1 through the first switch SW1. In order to transmit the ultrasonic signal in the opposite direction, the positions of both switches SW1, SW2 must be inverted, and again the signal can be transmitted all the way from the signal generator SG to the receiver circuit RC without any switching taking place during the transmission. In this way, switching noise is avoided and a more accurate metering may be performed.

It is known from the art that separate circuits have been used for constructing the signal generator and the receiver circuit. In these cases, however, either the transducers experience different impedances in transmit and receive situations, the amplification factors are different for the two transducers, the invention is not sufficiently disclosed to be more than theoretical, or a high impedance has been chosen.

The latter has the disadvantage that designing a signal generator having an output impedance very much (100 to 1000 times) larger than the transducer impedances at the frequencies of interest (100 kHz to 10 MHz) is very challenging. It also has the disadvantage that the optimization of the output signal amplitude has to take into account the transducer impedances for obtaining optimal signal levels. This is not trivial as the impedances of ultrasonic transducers most often dependent on the temperature and differ among samples. Last but not least, such an approach is more sensitive to electrical noise.

In recent years, new types of operational amplifiers have been designed that make the very low impedances feasible, even in battery operated flow meters. Especially, the so-called current feedback operational amplifiers, which have a lower input impedance on the inverting input terminal but also have a higher bandwidth and a lower power consumption and a higher gain at high frequencies than other types of operational amplifiers, are beneficial for use in the present invention.

FIG. 4 illustrates schematically a coupling of ultrasonic transducers in an ultrasonic flow meter according to another embodiment of the invention, in which the same circuit is used as signal generator SG and as receiver circuit RC. The obvious advantage of this embodiment is that only one common operational amplifier OP and, consequently, also only one set of feedback components for providing the desired resulting feedback impedance Zfb are needed.

The price to be paid for this cost saving is that a switching of the signal way is needed during the transmission of the signal. As can be seen from FIG. 4, the two switches SW1, SW2, which connect the two transducers TR1, TR2, respectively, to the combined signal generator and receiver circuit SG/RC, each have three possible positions.

This means that each of the two transducers TR1, TR2 can be:

1. set up to be the transducer to transmit the ultrasonic signal by being coupled to the output terminal of the operational amplifier OP, from which it is to receive the electrical transmission signal, the common circuit SG/RC being operated as a signal generator,
2. set up to be the transducer to receive the ultrasonic signal by being coupled to the inverting input terminal of the operational amplifier OP, to which it is to transmit the electrical reception signal, the common circuit SG/RC being operated as a receiver circuit, or
3. disconnected from the common circuit SG/RC whenever the other transducer is connected to the common circuit.

Thus, by setting and changing the positions of the switches SW1, SW2 appropriately at the right times, the desired signal paths of the electrical transmission signal, the ultrasonic signal and the electrical reception signal can be obtained. For transmitting an ultrasonic signal from the first transducer TR1 to the second transducer TR2, the first transducer TR1 is first set up to transmit the ultrasonic signal by connecting it to the common circuit SG/RC being operated as a signal generator while the second transducer TR2 is disconnected from the common circuit SG/RC. Subsequently, when the ultrasonic signal has been transmitted by the first transducer TR1 but before it reaches the second transducer TR2, the first transducer TR1 is disconnected from the common circuit SG/RC and the second transducer TR2 is set up to receive the ultrasonic signal by connecting it to the common circuit SG/RC being operated as a receiver circuit. For transmitting the ultrasonic signal in the opposite direction, the connections of the two transducers TR1, TR2 is simply swapped as compared to the above description.

FIG. 5 illustrates schematically a coupling of ultrasonic transducers in an ultrasonic flow meter according to yet another embodiment of the invention. In this case, there are two receiver circuits RC1, RC2, each comprising an operational amplifier OPrc1, OPrc2 and a negative feedback circuit with impedances Zfb,rc1 and Ffb,rc2, respectively. This allows the two transducers TR1, TR2 to transmit an ultrasound signal simultaneously.

In order to do this, both of the transducers TR1, TR2 are first connected to the signal generator SG by setting the switches SW1, SW2 in the appropriate positions. An electrical transmission signal is transmitted simultaneously to the two transducers TR1, TR2, from which it is transmitted into the flow path (not shown) as an ultrasonic signal from each of the transducers TR1, TR2. Before the ultrasonic signal from the first transducer TR1 reaches the second transducer TR2 and vice versa, the positions of the switches SW1, SW2 are changed so that each of the transducers TR1, TR2 is connected to one of the receiver circuits RC1, RC2.

In this way, the ultrasonic signal can be sent both upstream and downstream along the flow path in a single operation. However, in order to level out any possible minor metering errors due to the fact that the two receiver circuits RC1, RC2 cannot be constructed to be completely identical, it should be assured that for every transmission of the ultrasonic signals, the connections between the transducers TR1, TR2 and the receiver circuits RC1, RC2 are interchanged, so that a given transducer TR1, TR2 is only connected to the same receiver circuit RC1, RC2 every second time.

Another difference in the coupling shown in FIG. 5 as compared to the couplings shown in the previous figures is that the digital pulsating signal is connected to the inverting input terminal of the operational amplifier OPsg of the signal generator SG through a filter impedance Zfilt, which is of influence on the amplification and the filtration of the electrical transmission signal, while the non-inverting input terminal of the operational amplifier OPsg is grounded.

Compared to the configuration of the signal generators SG shown in the previous figures, in which the input common mode voltage of the operational amplifier will exhibit some variation as the digital pulsating signal varies, this configuration has the advantage that the input common mode voltage is kept at a constant DC level. This is of importance for some types of operational amplifiers, especially the fastest ones with the highest bandwidth.

FIG. 6 shows a diagram of most of the essential electronic components in an ultrasonic flow meter according to an embodiment of the invention.

In this diagram, the two inputs marked IN1 and IN2 indicate the input of two digital pulsating signals, the two resistors R4 and R7 are there for generating a symmetric transmission signal to the signal generator SG from the two digital signals, and the capacitor C7 forms an AC coupling between the incoming transmission signal and the signal generator SG.

The two resistors R3 and R9 and the two capacitors C1 and C9 form a low-pass filter for the incoming transmission signal (corresponding to Zfilt in FIG. 5).

OPsg is the operational amplifier of the signal generator SG, which not only amplifies the incoming transmission signal, but also is important for adjusting the output impedance of the signal generator SG to be very low, i.e. substantially zero.

The three resistors R1, R2 and R40 and the two capacitors C29 and C30 together constitute the negative feedback impedance of the operational amplifier OPsg (corresponding to Zfb,sg in FIGS. 3 and 5).

The three resistors R11, R41 and R45 together form a voltage divider defining the reference voltages on the non-inverting inputs of OPsg and OPrc. Because OPsg and OPrc are both configured as inverting amplifiers, the reference voltages are the same as the input common mode voltages on the two operational amplifiers OPsg and OPrc, respectively. The reference voltages to the two operational amplifiers OPsg and OPrc are decoupled by the two capacitors C2 and C25.

V3 (corresponding to VCC in FIGS. 7a and 7b) is the positive supply voltage for the circuit. In low-power consumption flow meters, such as battery operated flow meters, V3 can advantageously be cut off with a switch (not shown) most of the time, so that the circuit is operated at a very low duty cycle.

In the embodiment shown in FIG. 6, the switching unit SU comprises four switches implemented on a single CMOS die in an integrated circuit for coupling of the transducers TR1, TR2 to the signal generator SG and the receiver circuit RC. The pins IN1-IN4 of the switching unit SU each controls one of the four switches connected between the lines D1-S1, D2-S2, D3-S3 and D4-S4, respectively, by asserting a high voltage. In the diagram shown in FIG. 6, the switches are configured to transmit a signal from transducer TR1 to transducer TR2. For a signal to be transmitted from transducer TR2 to transducer TR1, opposite voltages must be applied to IN1-IN4. Preferable, IN1-IN4 are controlled by a microcontroller. The two resistors R10 and R36 are small current limiting resistors. The stability of the operational amplifiers OPsg and OPrc is increased by limiting the capacitive load on the amplifiers OPsg, OPrc.

The two capacitors C8 and C15 provide an AC coupling of the signals to and from the transducers TR1, TR2. This allows the use of single supply voltage operational amplifiers OPsg, OPrc as the ones shown in FIG. 6 without any DC voltage on the transducers TR1, TR2.

The two resistors R13 and R14 are bleeders for discharge of the transducers TR1, TR2 in case a charge is produced thereon due to pyroelectric effects or due to other circumstances.

The two ultrasonic transducers TR1 and TR2 are preferably constituted by piezoelectric transducers.

OPrc is the operational amplifier of the receiver signal RC, which produces an amplified output signal OUT from the electrical reception signal from the transducers TR1, TR2, but also is important for adjusting the input impedance of the receiver circuit RC to be very low, i.e. substantially zero.

The resistor R44 and the capacitor C5 constitute a filtering of the supply voltage for the operational amplifier OPrc of the receiver circuit RC.

The two resistors R5 and R6 and the capacitor C4 together constitute the negative feedback impedance of the operational amplifier OPrc (corresponding to Zfb,rc in FIG. 3).

The two resistors R8 (corresponding to RCC in FIGS. 7a and 7b) and R43 are used for current sensing of the power supply currents to the operational amplifier OPsg. In some embodiments of the invention, R43 may be omitted for increased stability. If OPsg is chosen to be an operational amplifier with low supply voltage rejection ratio, switches (not shown) are needed to short-circuit R8 and R43 during transit time measurements.

The two capacitors C6 and C33 have the purpose of decoupling the supply voltages to OPsg. If the values of these two capacitors are too high, the voltages across R8 and R43 do not properly reflect the power supply currents to the operational amplifier OPsg. If, on the other hand, the values of C6 and C33 are too low, the operational amplifier OPsg is potentially unstable.

The two capacitors C13 and C14 and the two resistors R12 and R15 are components needed to combine the two supply current signals SCSa, SCSb into a single signal supply current signal SCS. R12 and R15 also define the DC voltage level for following circuits of the flow meter, such as an Analogue-Digital converter.

V1 is a supply voltage needed to generate the DC voltage level for the combining circuitry C13, C14, R12, R15. By careful selection of components, V3 may be reused in place of the separate supply voltage V1.

FIGS. 7a and 7b illustrate schematically the set-up for performing a first and a second step, respectively, in obtaining supply current signal SCS-, SCS+ of an active component driving an ultrasonic transducer.

In the first step, which is illustrated in FIG. 7a, a first, short digital pulsating input signal DPSa is used as an input for a signal generator SG driving an ultrasonic transducer TR1, TR2 to which it may be connected through a switching unit SU. The signal generator SG may comprise a negative feedback coupled operational amplifier (OP; OPsg), as shown in the previous figure, or it may comprise another active component, which is able to amplify the input signal DPSa and provide an output impedance of the signal generator SG, which is very low, i.e. substantially zero. This active component might, for instance, be constituted by a digital circuit driving the transducer.

A current sensing resistor RCC (corresponding to R8 in FIG. 6) is arranged in series between the active component of the signal generator SG and the positive voltage supply VCC (corresponding to V3 in FIG. 6) for this active component. Now, by monitoring the voltage across this current sensing resistor RCC, a first supply current signal SCSa representative of the current supplied to the active component from the positive voltage supply can be obtained as illustrated on the right side of FIG. 7a.

It should be noted that when the input signal DPSa stops oscillating, the transducer will continue to be oscillating for some time, still dragging some current from the positive voltage supply through the active component. This is reflected in the first supply current signal SCSa, which comprises a higher number of oscillations than the first input signal DPSa, as is indicated in FIG. 7a, the latest part of the signal DPSa showing that the self-oscillating transducer TR1, TR2 performs a dampened oscillation.

A can also be seen from the first supply current signal SCSa illustrated in FIG. 7a, this signal is truncated in the sense that only one half part of each oscillation is comprised in the signal, the signal value being zero in the other half part of each oscillation. This is due to the fact that, if the active component of the signal generator is coupled to be a non-inverting amplifier, the positive voltage supply VCC only delivers the current to the active component when the voltage of the input signal DPSa is higher than the input common mode voltage of the active component, and if the active component is coupled to be an inverting amplifier, the positive voltage supply VCC only delivers the current to the active component when the voltage of the input signal DPSa is lower than the input common mode voltage of the active component, Therefore, in order to obtain a second supply current signal SCSb comprising the other half part of each oscillation, the measurement is repeated with another digital pulsating input signal DPSb, which is identical to the first input signal DPSa with the one exception that the polarity of the signal has been inversed.

It should be noted that the two supply current signals SCSa, SCSb can be obtained simultaneously from the positive and the negative voltage supplies of the active component of the signal generator SG, respectively, if a similar current sensing resistor (not shown in FIGS. 7a and 7b but corresponding to R43 in FIG. 6) is arranged in series between the active component and the negative voltage supply (not shown) for the active component.

If the signal generator SG is configured as a Class A amplifier, the current drawn into the positive voltage supply pin is substantially constant, and a sensing resistor (R43) has to be arranged in series with the negative voltage supply for a useful signal to be obtained.

By subtracting the two supply current signals SCSa, SCSb from each other as illustrated in FIG. 8a, a subtraction supply current signal SCS is obtained, from which the oscillation period Tscs of the dampened oscillation of the transducer TR1, TR2 can easily be determined by measuring the time difference between two appropriately chosen zero crossings of the signal SCS as is also indicated in FIG. 8a.

The relation between the oscillation period Tscs and the frequency $f_D$ and the angular frequency $O_D$ of the dampened transducer oscillation is well-known:

$$Tscs = \frac{1}{f_D} = \frac{1}{2\pi\omega_D} \quad \text{(Equation 3)}$$

Furthermore, by adding the two supply current signals SCSa, SCSb to each other as illustrated in FIG. 8b, an addition supply current signal SCS+ is obtained, the envelope Escs of the decreasing part of which can be determined. This envelope Escs has the shape of an exponential curve with respect to the time t, the mathematical formula describing the envelope being $$Escs = -ke^{at} \quad \text{(Equation 4)}$$

where k is a constant and a is the damping coefficient of the dampened oscillation of the transducer TR1, TR2.

In principle, both Op and a could be found from each of the measured supply current signals SCSa, SCSb alone. However, the two quantities can be determined with much higher accuracy using the subtraction supply current signal SCS and the addition supply current signal SCS+ as illustrated in FIGS. 8a and 8b.

The two quantities Op and a are very useful for characterizing the transducer, being indicative of the condition of the transducer, such as, for instance, whether it might be broken or whether there might be some air around a transducer, which is supposed to be surrounded by water, etc.

Figure 10:
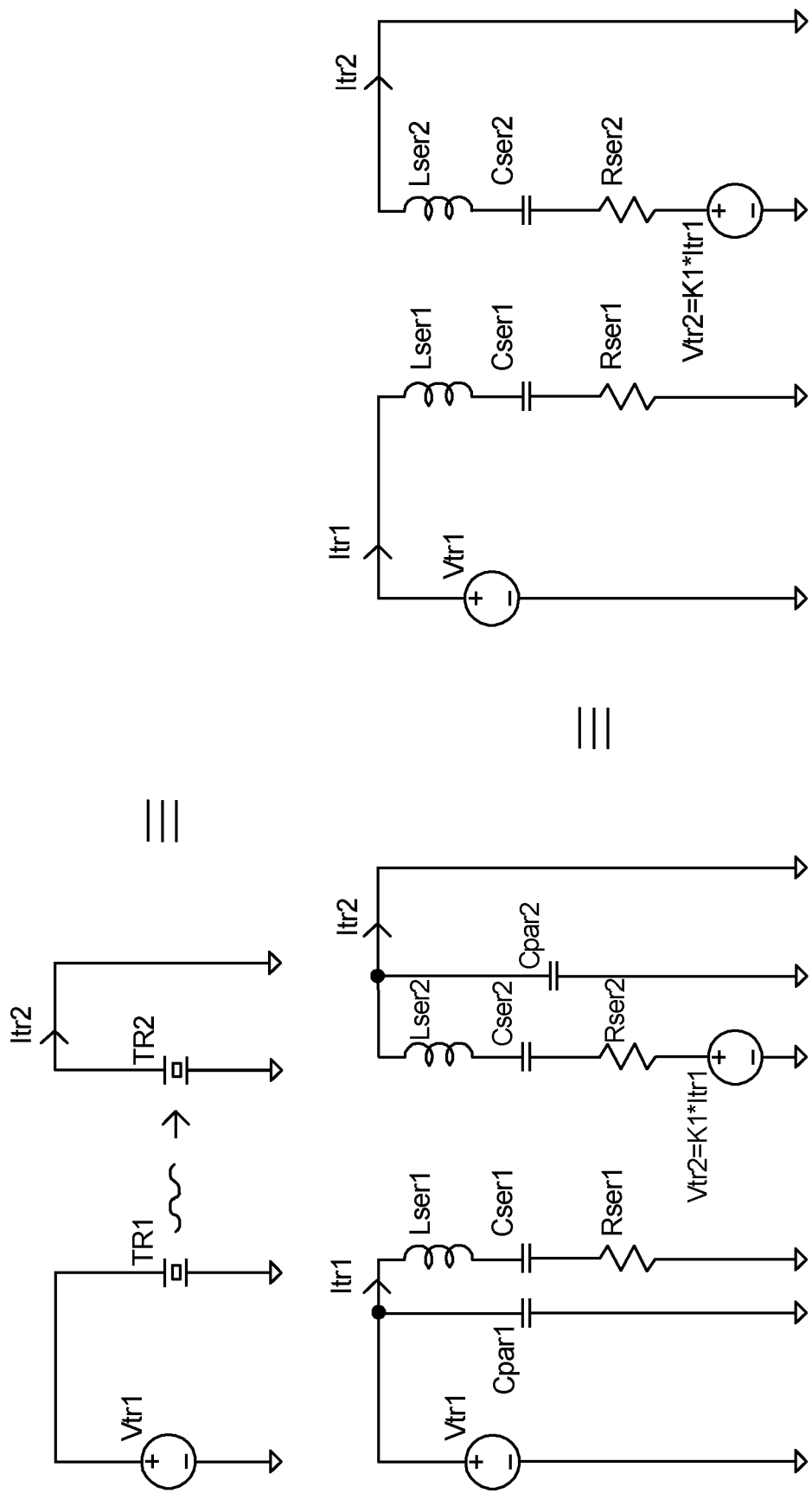
FIG. 10 illustrates some of the steps in the derivation of a simple equivalence diagram of an ultrasound flow meter, which can be used for simulating the signal chain through a flow meter according to the invention.

The equivalence diagram in the first part of FIG. 10 illustrates how the flow meter can be equated by a system comprising two ultrasonic transducers TR1, TR2, wherein the first transducer TR1, upon which a transmission signal in the form of a voltage signal Vtr1 is impressed, transmits an ultrasound signal to the second transducer TR2, which in turn produces a reception signal in the form of a current signal Itr2.

For a given input signal to the signal generator of the flow meter, the voltage signal Vtr1 impressed on the first transducer TR1 can be taken to be the same for each transit time measurement due to the fact that all components of the signal generator are the same for each measurement. This also means that the impressed signal Vtr1 can be calculated from the input signal using a filter model of the signal generator, once this filter model has been determined once and for all, or it can be recorded by an analogue-digital converter before the simulation procedure, which is described below.

Figure 1:
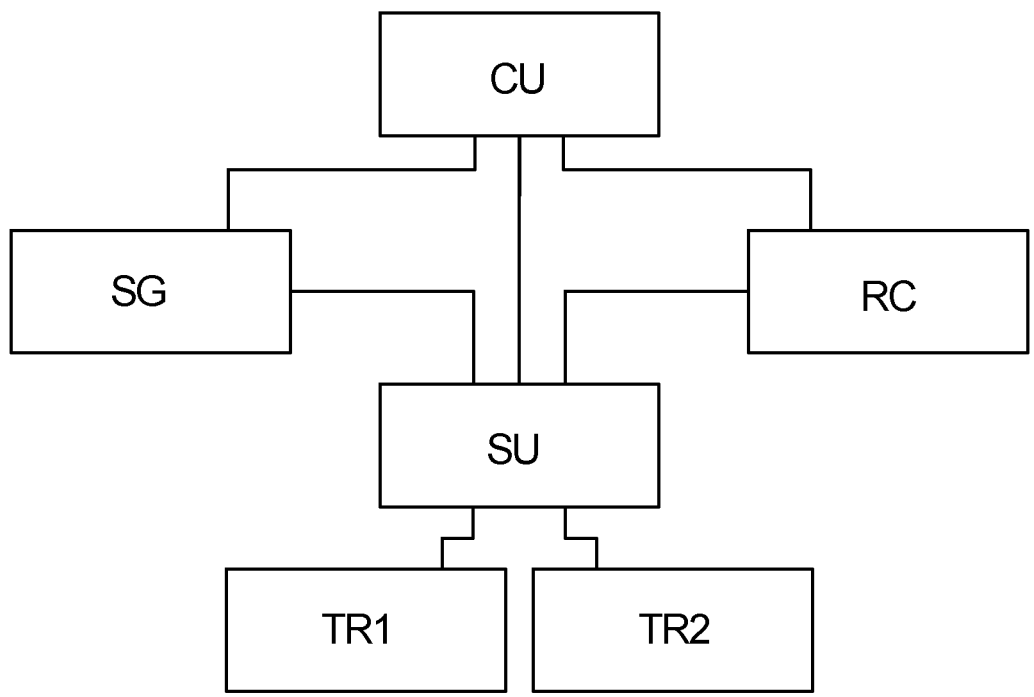
Figure 2A:
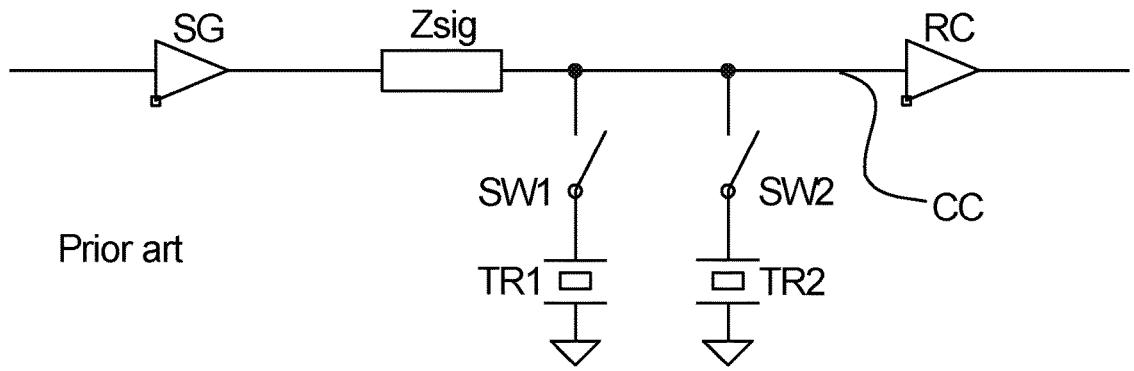
Figure 2B:
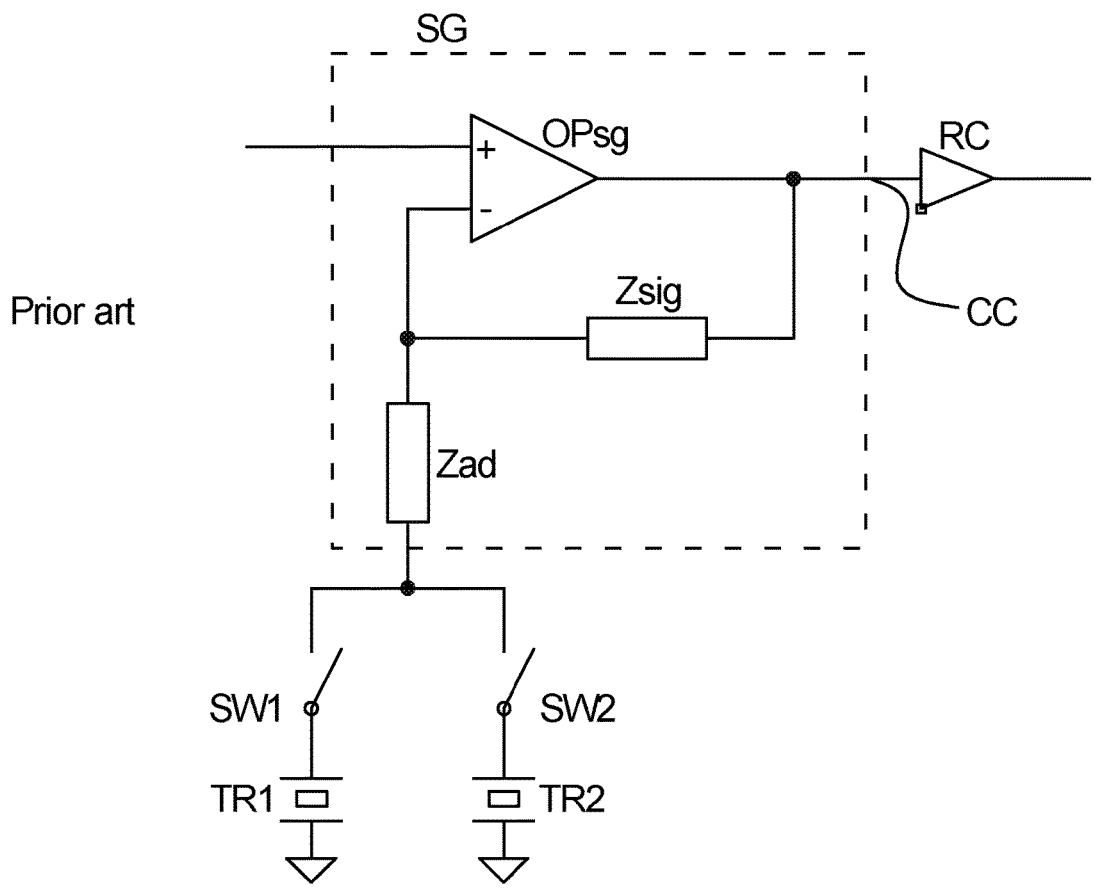
Figure 3:
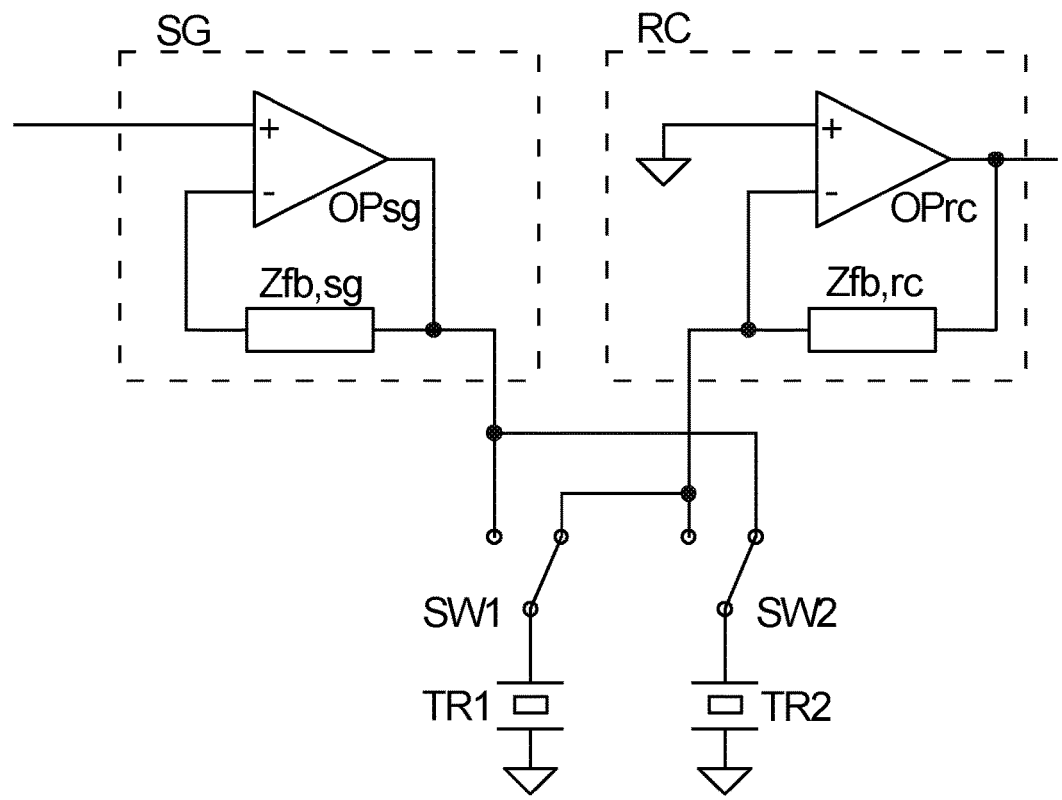
Figure 4:
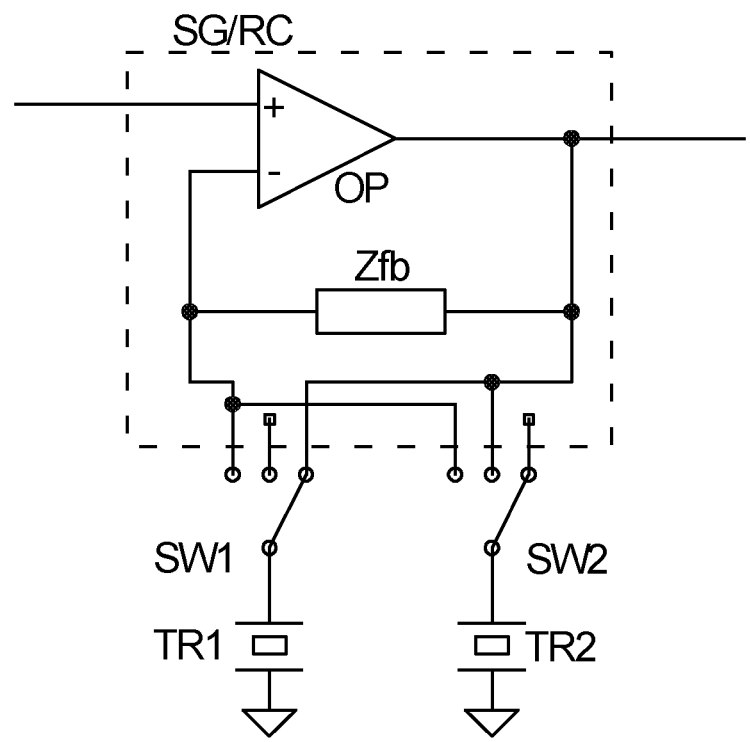
Figure 5:
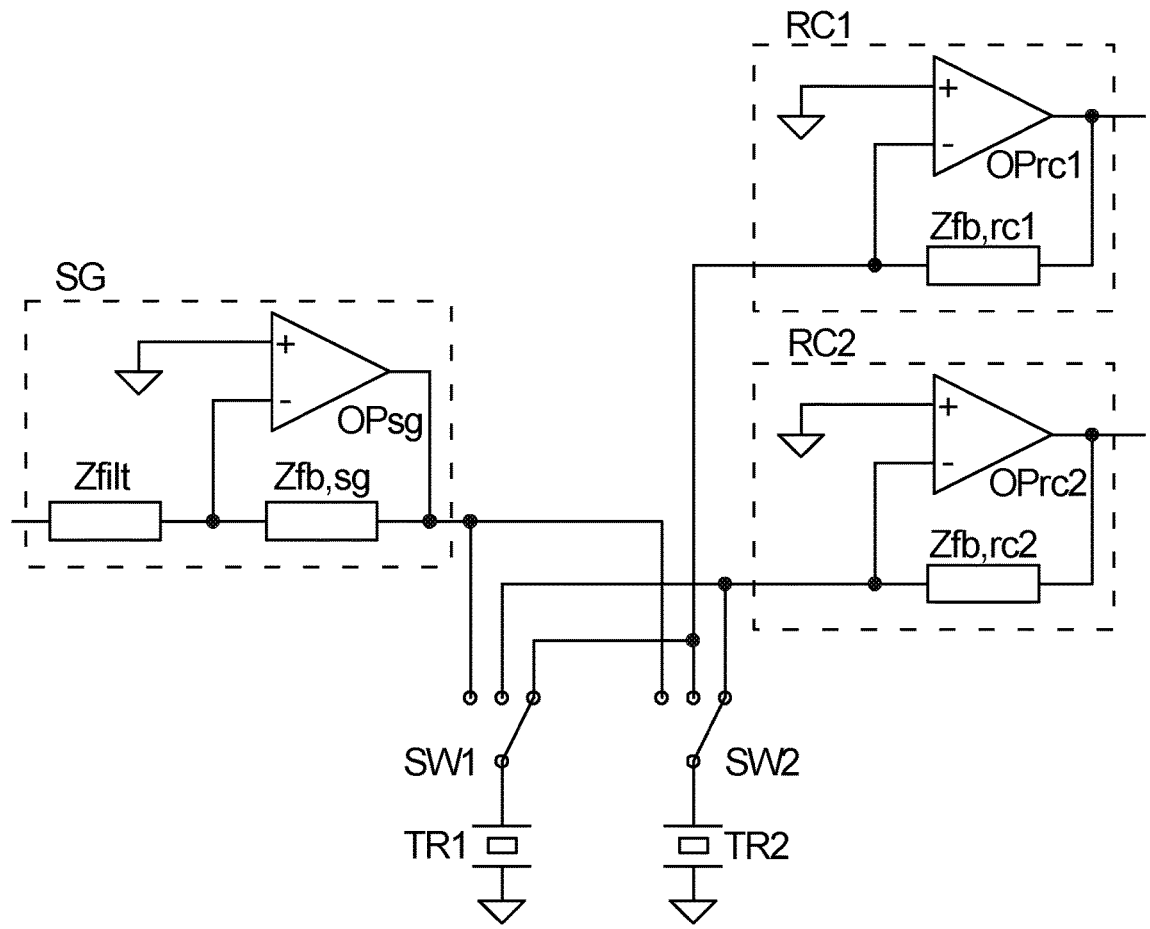
Figure 6:
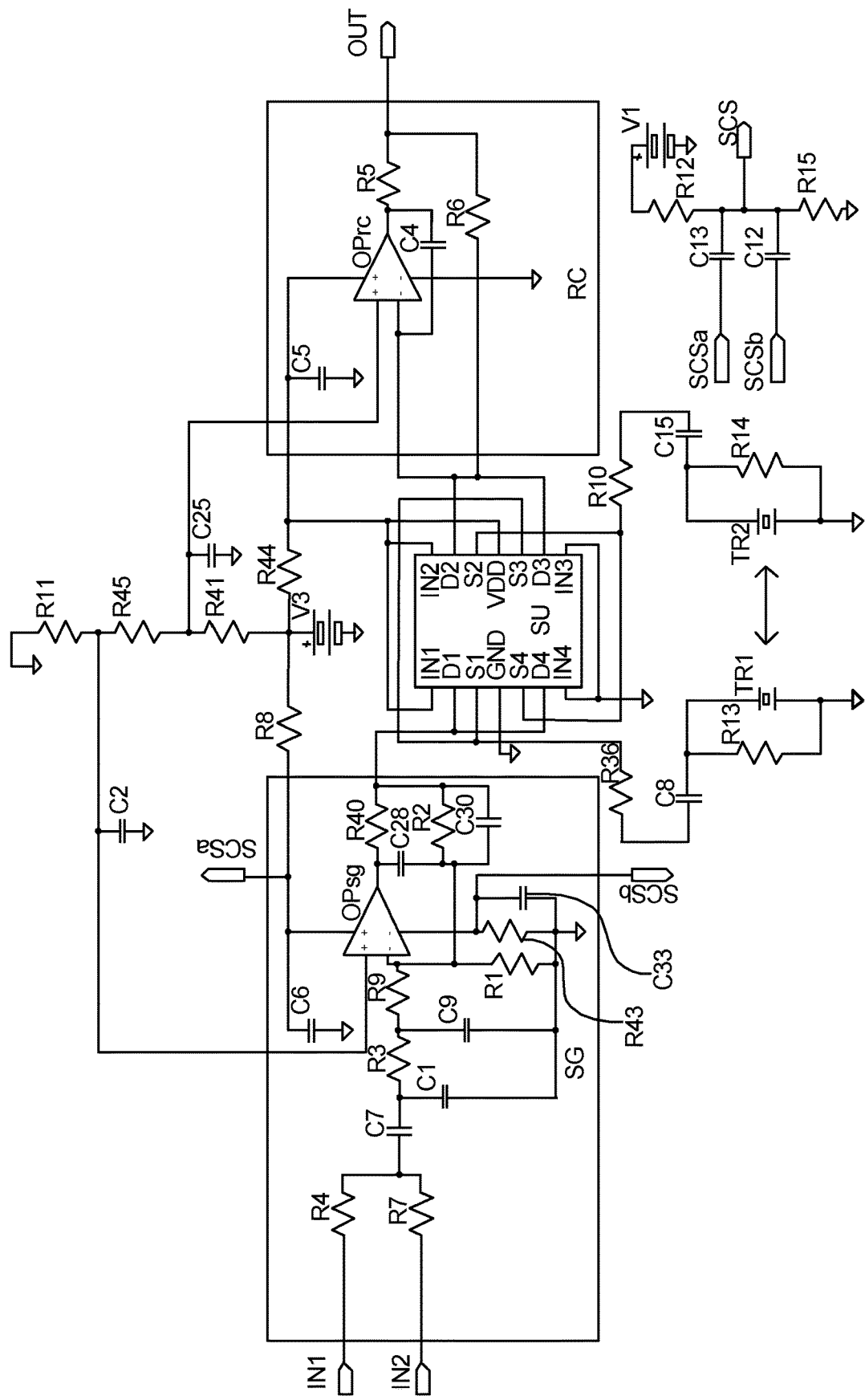
Figure 7A:
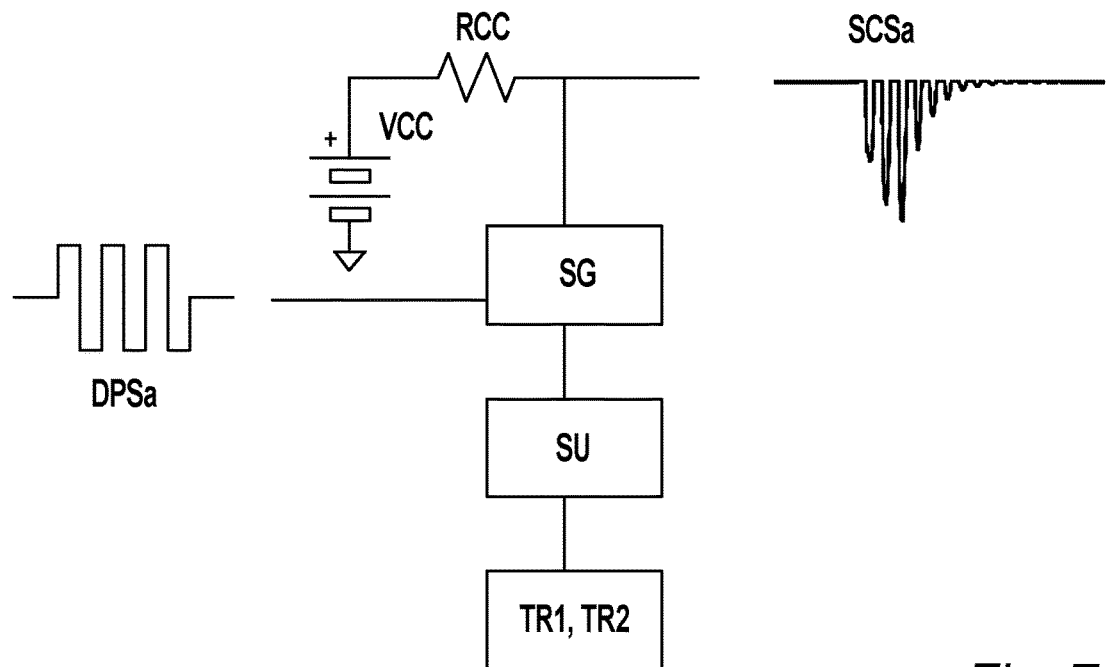
Figure 7B:
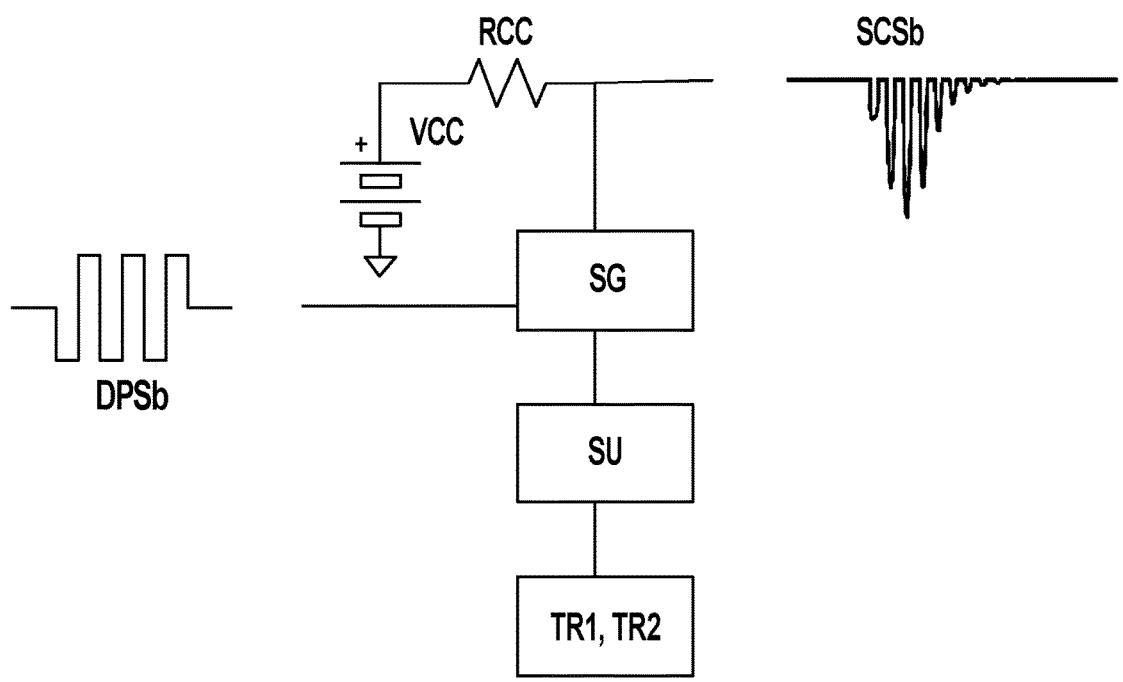
Figure 8A:
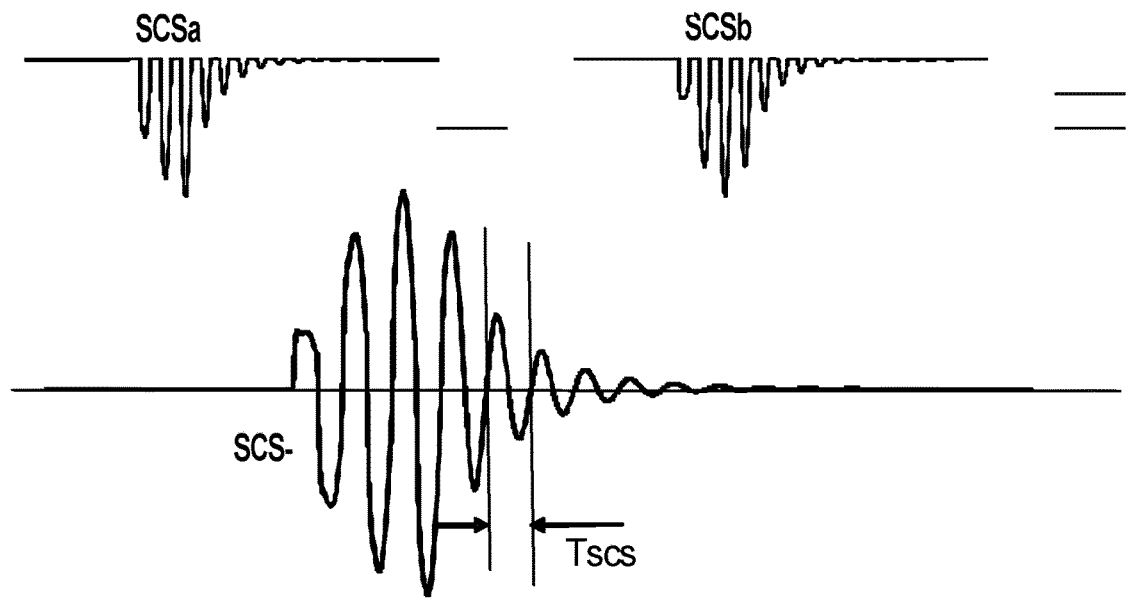
Figure 8B:
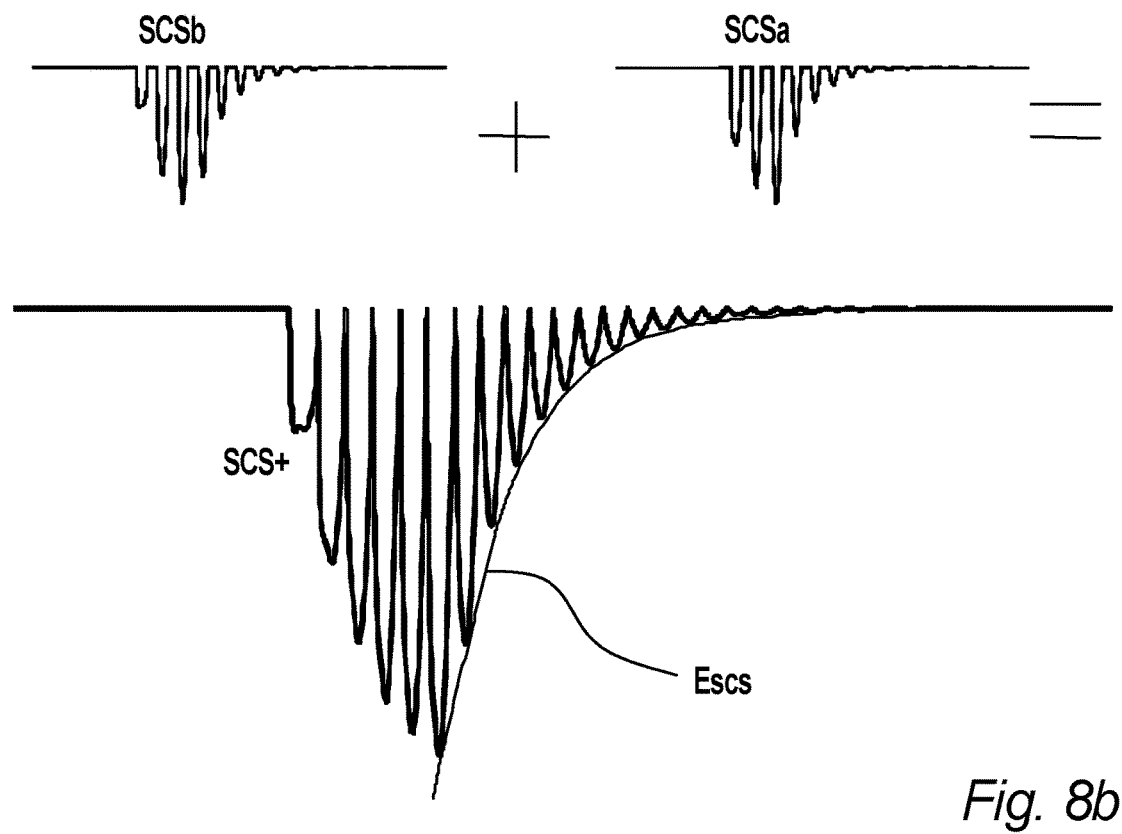
Figure 9:
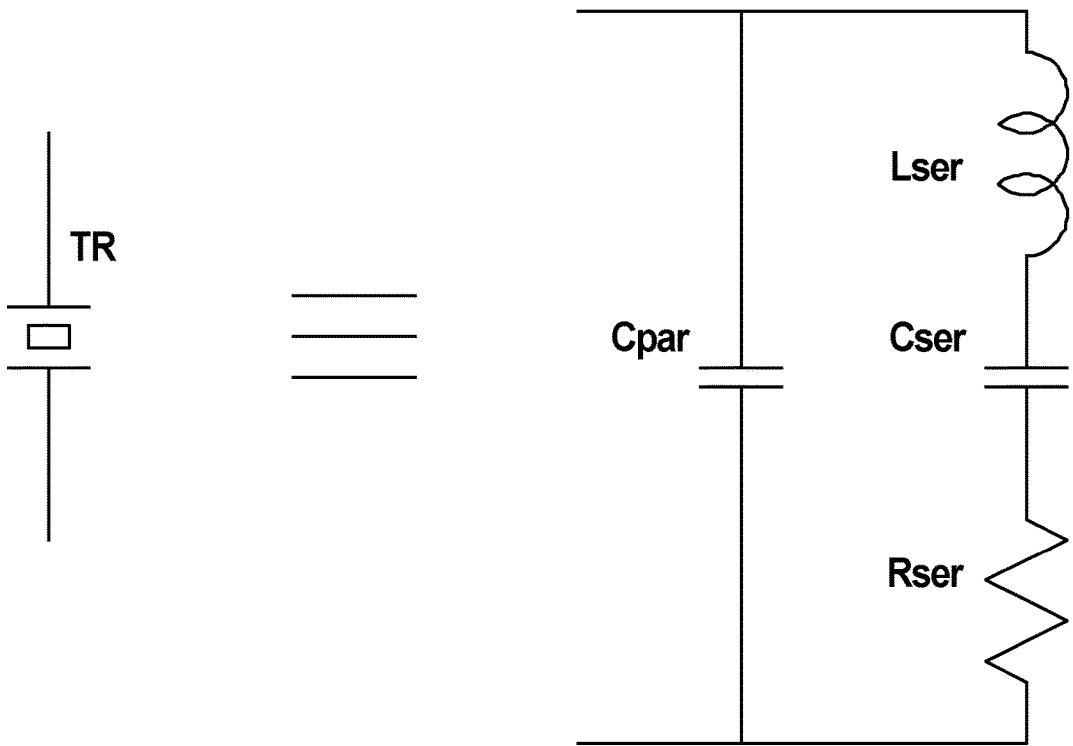
FIG. 9 illustrates a well-known equivalence diagram of an ultrasonic transducer TR, comprising a parallel capacitor Cpar coupled in parallel with a series connection of a series inductor Lser, a series capacitor Cser and a series resistor Rser.

Introducing the equivalence diagram from FIG. 9 for each of the two transducers TR1, TR2 in the equivalence diagram of the flow meter shown in the first part of FIG. 10 results in the diagram shown in the second part of FIG. 10. Here, it is noted that, due to the fact the ultrasound signal transmitted by the first transducer TR1 is proportional to the current signal Itr1 passing through the transducer TR1, the ultrasound signal reaching the second transducer TR2 can be equated by a voltage signal Vtr2 being impressed on the transducer TR2, said voltage signal Vtr2 being proportional to the current signal Itr1 as indicated in FIG. 10 by the proportionality factor K1.

The parallel capacitors Cpar1, Cpar2 have no influence on the impressed voltages Vtr1, Vtr2 across the series connections Lser1, Cser1, Rser1 and Lser2, Cser2, Rser2, respectively, in the equivalence diagram in the second part of FIG. 10 and can, thus, be ignored. Therefore, the resulting equivalence diagram of the flow meter to be used for simulating the signal chain through the flow meter is the one shown in the third and final part of FIG. 10.

The relations between the impressed voltage signals Vtr1, Vtr2 and the resulting current signals Itr1, Itr2 can be found by well-known differential equations:

$$Itr1 = \frac{Vtr1}{sLser1 + \frac{1}{sCser1} + Rser1} \quad \text{(Equation 5)}$$

$$= \frac{1}{Lser1} \frac{s}{s^2 + s\frac{Rser1}{Lser1} + \frac{1}{Lser1Cser1}} Vtr1$$

$$Itr2 = \frac{Vtr2}{sLser2 + \frac{1}{sCser2} + Rser2} \quad \text{(Equation 6)}$$

$$= \frac{K1 Itr1}{sLser2 + \frac{1}{sCser2} + Rser2}$$

$$= \frac{K1}{Lser1 Lser2} \frac{s}{s^2 + s\frac{Rser1}{Lser1} + \frac{1}{Lser1Cser1}}$$

$$\frac{s}{s^2 + s\frac{Rser2}{Lser2} + \frac{1}{Lser2Cser2}} Vtr1$$

$$= K2 \frac{s}{s^2 + 2\alpha_1 s + \omega_1^2} \frac{s}{s^2 + 2\alpha_2 s + \omega_2^2} Vtr1$$

$\alpha_1$ and $\alpha_2$ are the damping coefficients relating to the first ultrasonic transducer TR1 and the second ultrasonic transducer TR2, respectively, corresponding to the damping coefficients that can be found from the envelope of the addition supply current signals SCS+, as described above.

$\omega_1$ and $\omega_2$ are the undampened angular oscillation frequencies of the first ultrasonic transducer TR1 and the second TR2 ultrasonic transducer, respectively. The relation between these undampened angular oscillation frequencies $\omega_1$, $\mu_2$ used in the simulation equations and the corresponding dampened angular oscillation frequencies $\omega_{D1}$ and $\omega_{D2}$ found by measuring the time difference between two appropriately chosen zero crossings of the dampened oscillation in the subtraction supply current signals SCS, as described above, is as follows:

$$\omega_1 = \sqrt{\omega_{D1}^2 + \alpha_1^2} \wedge \omega_2 = \sqrt{\omega_{D2}^2 + \alpha_2^2} \quad \text{(Equation 7)}$$

K2 is a proportionality factor, which can be calculated. However, like the specific component values of Cser1, Lser1, Rser1, Cser2, Lser2, Rser2 of the equivalence diagram in the last part of FIG. 10, the value of K2 is not needed for using Equation 6 for simulating the signal chain through the flow meter.

The last expression of Equation 6, which is a differential equation for a circuit comprising two second order oscillating circuits, can be simulated by means of well-known mathematical tools, such as for instance the Runge-Kutta method.

Figure 11:
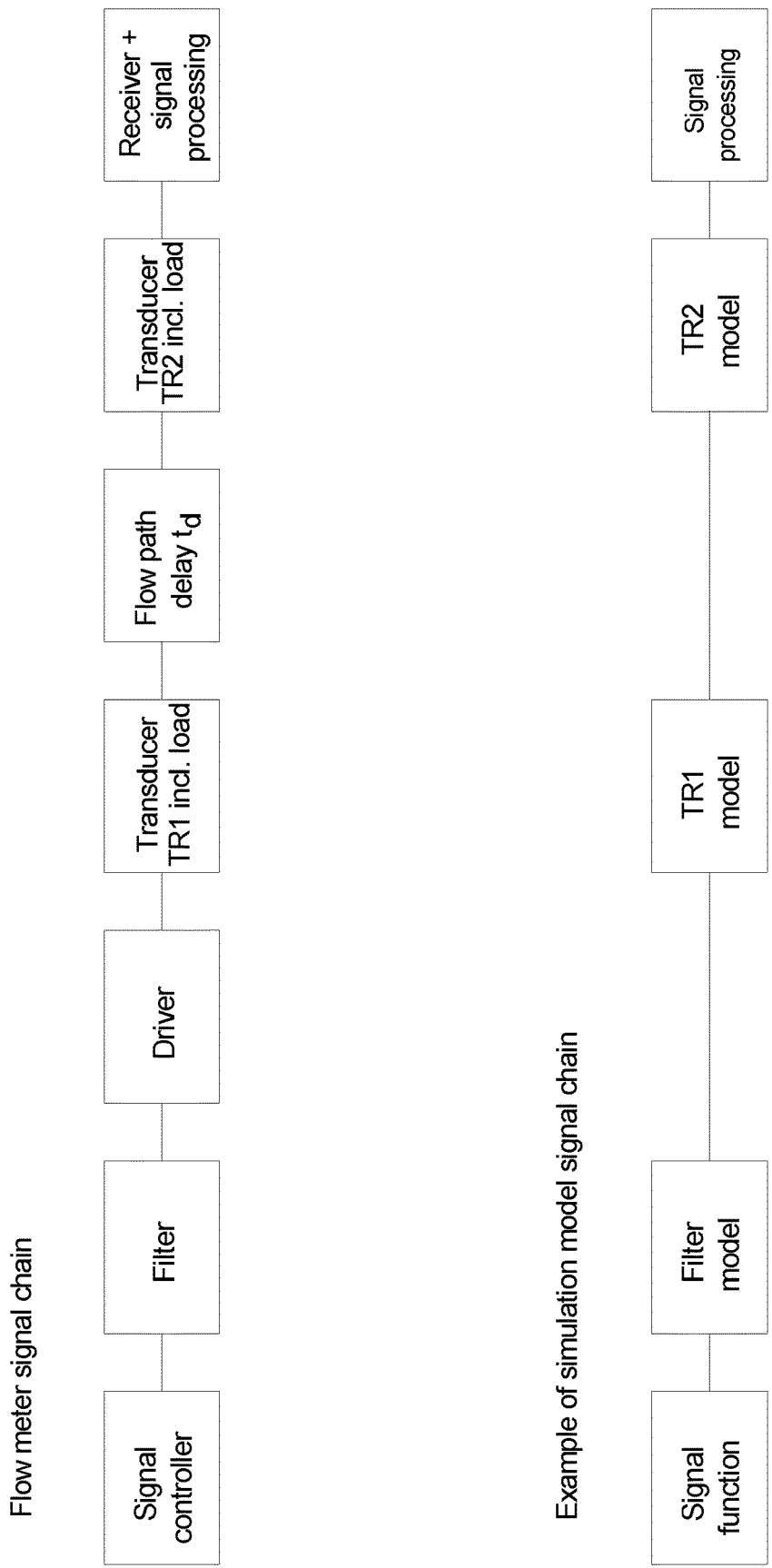

FIG. 11 illustrates some of the differences and similarities between a physical and a simulated signal chain through a flow meter according to the invention.

In the simulated signal chain, the physical transducers TR1, TR2 and the loads related to them are modelled, for instance as already described above.

In the fully simulated signal chain in FIG. 11, the output from the physical signal generator, which filters a digital input signal from a signal controller and works as a driver for the first transducer TR1 by amplifying the filtered input signal, is simulated by a signal function being filtered using a filter model of the signal generator before being used as input function for the simulated transducer model. In another embodiment of the simulated signal chain, the input function for the simulated transducer model may be produced by recording the actual output from the a physical signal generator by an analogue-digital converter, thus obtaining a signal chain that is partly physical, partly a simulated model.

The reception of the electrical reception signal by the receiver circuit and the subsequent signal processing in the physical signal chain is replaced by signal processing alone in the simulated signal chain, this signal processing optionally including a model (not shown) of the receiver circuit.

Thus, if the signal function in the simulated signal chain does, in fact, correspond to the input signal from the signal controller in the physical signal chain, and if the filter models of the signal generator and (optionally) the receiver circuit and the transducer models are adequate, the only difference between the output of the final signal processing of the simulated signal chain and the output of the final signal processing of the physical signal chain will be the time delay $t_d$ of the ultrasonic signal in the flow path, which is not a part of the simulated signal chain.

Figure 12:
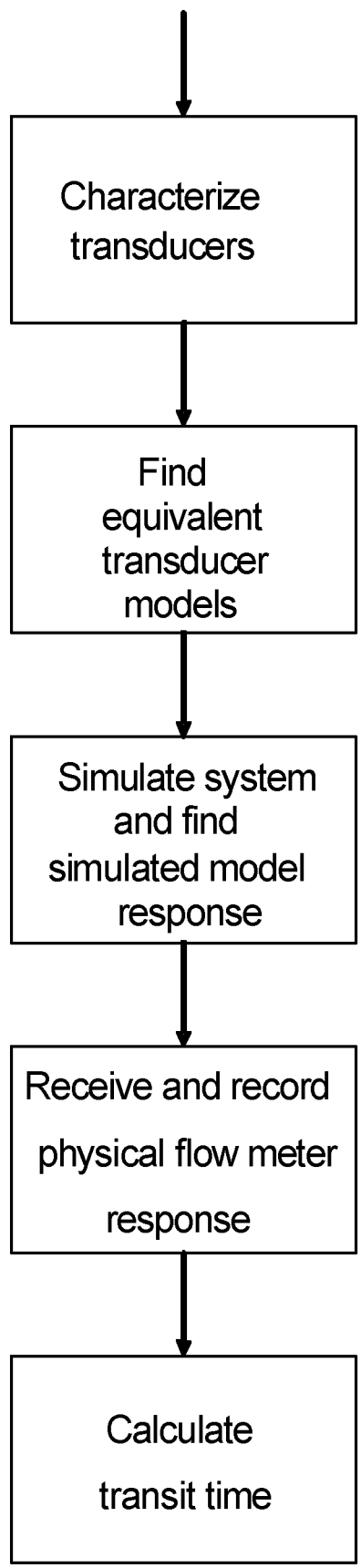

The simulated model response being substantially identical to the physical flow meter response except for the time delay $t_d$ of the ultrasonic signal in the flow path and a possible amplification factor makes it possible to determine this time delay $t_d$ very precisely by following a method like the one illustrated schematically in FIG. 12.

The first step in this method is to characterize the two transducers TR1, TR2 by determining characteristic quantities, such as the angular frequency $\omega_D$ and the damping coefficient $\alpha$ of dampened oscillations of the transducers TR1, TR2 as described above.

Secondly, by using the known angular oscillation frequency $\omega$ of the transmission signal used in the flow meter, an equivalence model of the transducers TR1, TR2 can be found using Equations 5-7, and a numerical simulation model of the transducers TR1, TR2 and the electronic circuits of the signal generator SG and the receiver circuit RC can be established.

Thirdly, the system can be simulated by entering the input signal function (or alternatively a sampled version of the physical transmission signal reaching the first transducer) into the numerical simulation model, whereby the simulation model response, i.e. the output signal from the receiver circuit RC as it would be according to the model, if there was no time delay in the transmission of the ultrasonic signal between the two transducers TR1, TR2, can be found.

In the fourth step of the method, the physical flow meter response, i.e. the physical reception signal actually received by the receiver circuit RC, is recorded.

Finally, the absolute transit time can be calculated by determining the time delay of the physical flow meter response as compared to the simulation model response.

Figure 13:
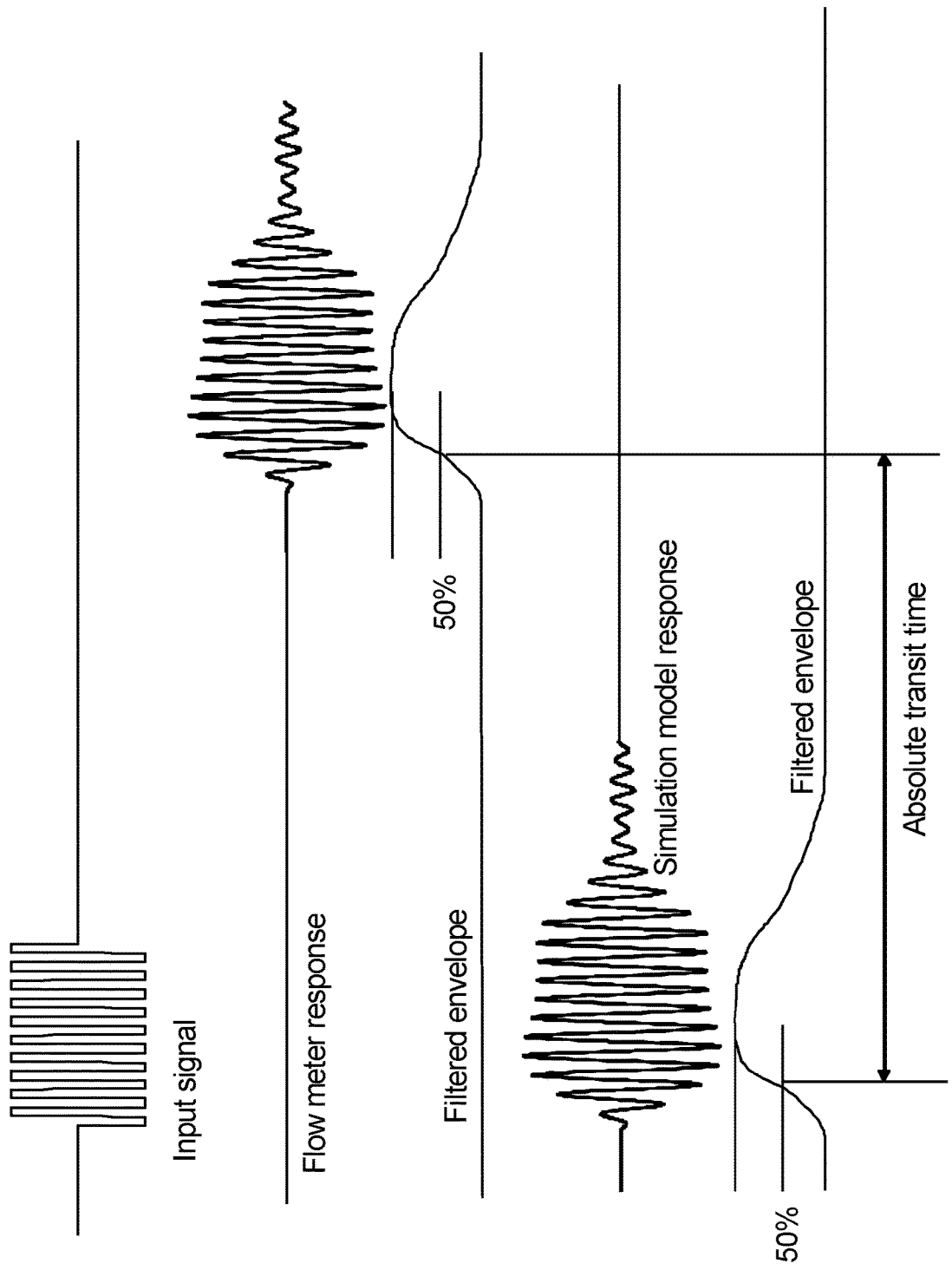

FIG. 13 illustrates one example of how such a calculation of the absolute transit time may be performed according to the invention.

Following the above-described method, an input signal entered to the system results in a measured physical flow meter response with a certain delay and in a simulation model response with substantially no delay. As mentioned above, if the equivalence model of the transducers TR1, TR2 is adequate, the two response signals will be substantially identical except from the time delay, which is illustrated in FIG. 13.

Now, the absolute transit time, i.e. the time delay between the two signals, can be determined very precisely, for instance by finding a filtered envelope of each of the two signals and determining the time difference between the two points, in which the filtered envelopes have reached 50% of their maximum value, respectively. This approach for finding the absolute transit time is illustrated schematically in FIG. 13.

Using a method like the one described above, the absolute transit times, corresponding to $t_1$ and $t_2$ in Equation 1, can be determined independently of the transducer parameters with very high absolute accuracy (down to about 100 nanoseconds for 1 MHz transducers, which is significantly more precise than what is possible in all previously known systems).

Normally, flow meters according to the invention will perform flow metering at regular time intervals, typically in the range between 0.1 second and 5 seconds. However, it should be noted that, for instance in order to extend the life time of a battery supplying the electricity for a flow meter, the characterization of transducers and simulation of the flow meter system do not need to be repeated for every flow metering performed by the flow meter.

The transducer characteristics change slowly over time due to aging of the transducers TR1, TR2 and more spontaneously due to changes in the temperature of the fluid in the flow path in which they are arranged.

Thus, new transducer characterizations and determination of an updated simulation model of the flow meter system for use in the calculation of absolute transit times may advantageously by performed at regular predetermined time intervals and/or when a change of temperature above a certain predetermine limit is detected, the temperature change being indicated by a change in the calculated transit time due to the dependency of ultrasound speed on the temperature of the medium in which the ultrasound propagates.

Due to the high costs (and the high power consumption) of very fast analogue-digital converters, slower converters may advantageously be used in flow meters according to the invention. However, as is well-known from the Nyquist theorem, if a signal is sampled at a frequency lower than twice the maximum frequency occurring in the signal, the analogue signal cannot be reconstructed without a certain distortion.

Thus, if a low sampling frequency is used for recording the electrical reception signal received by the receiver circuit of a flow meter according to the invention, the physical flow meter response signal will be distorted. If, however, the simulation model response is subjected to the same undersampling, a similar distortion of this signal will take place, and the two response signals can still be compared for finding a very precise measure of the absolute transit time as described above.

Figure 14A:
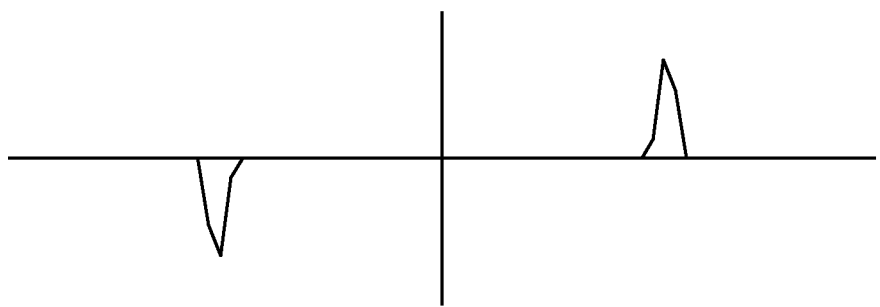
Figure 14B:
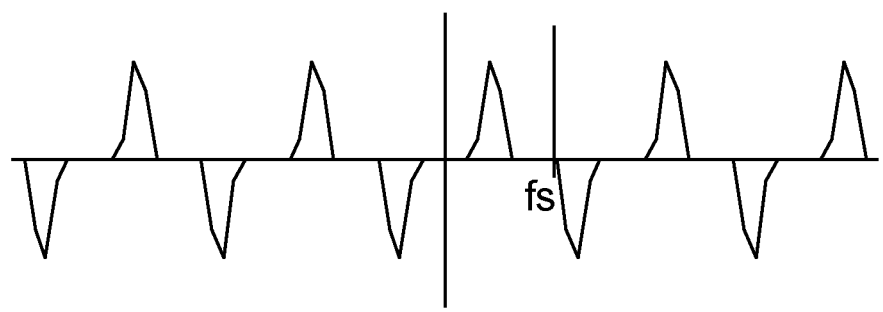
Figure 14C:
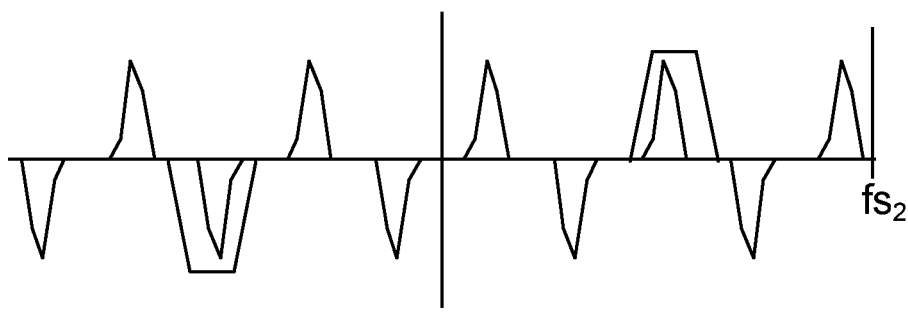

The well-known spectral consequences of undersampling a continuous signal are illustrated schematically in FIGS. 14*a-c*.

FIG. 14*a* illustrates an example of the frequency spectrum of a continuous signal, while FIG. 14*b* illustrates how undersampling (in this case with a sampling frequency fs of ⅚ of the signal frequency) results in the creation of an infinite number of aliases of the original spectrum.

FIG. 14*c* illustrates schematically how the undersampled signal can be reconstructed by changing the sampling frequency to the Nyquist sampling frequency $fs_2$ and filtering the signal with an FIR reconstruction filter, the frequency band of which is indicated in the figure.

The distortion of the reconstructions of undersampled continuous signals is illustrated schematically in FIGS. 15*a-b* and 16*a-b*.

Figure 15A:
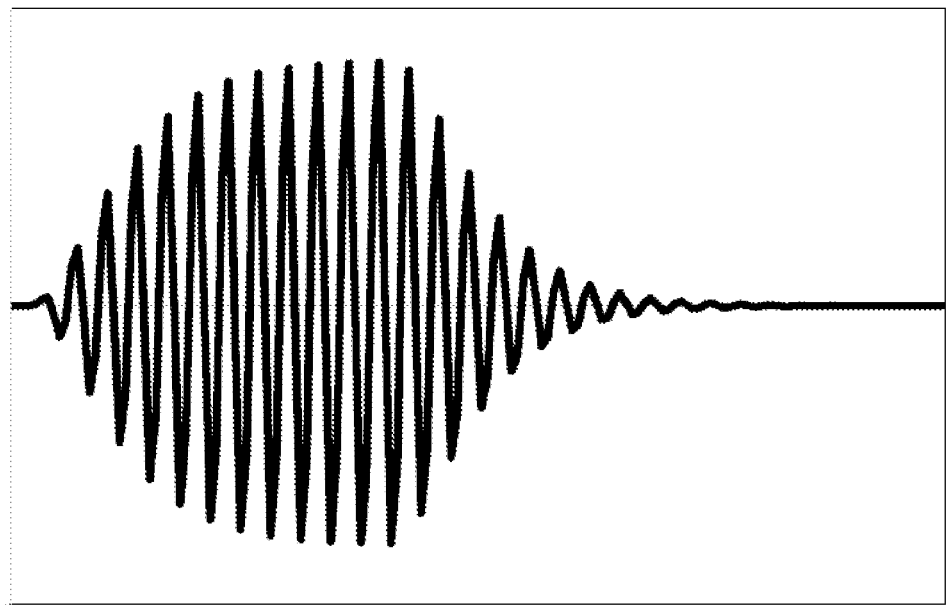
Figure 15B:
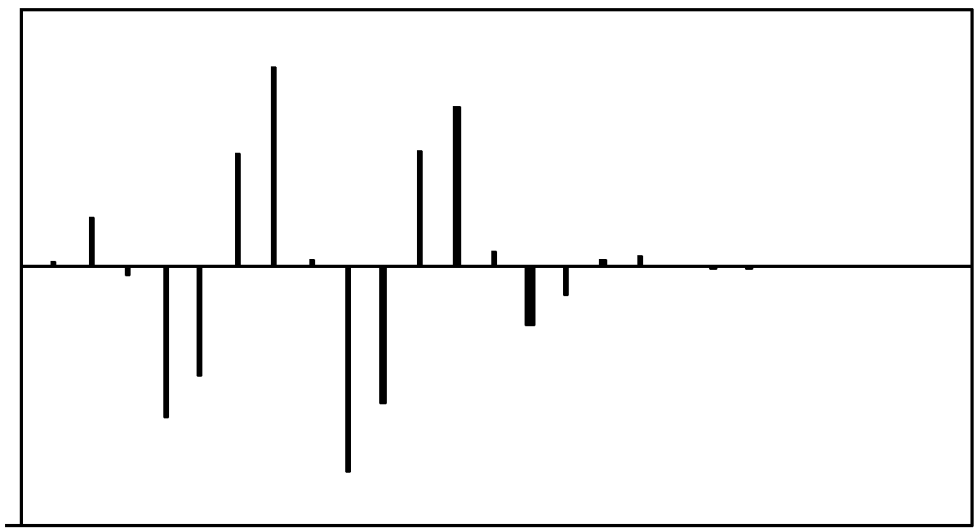

FIG. 15*a* illustrates an example of a continuous signal, while FIG. 15*b* illustrates the digital samples obtained by sampling the continuous signal of FIG. 15*a* at a sampling frequency of ⅚ of the signal frequency.

Figure 16A:
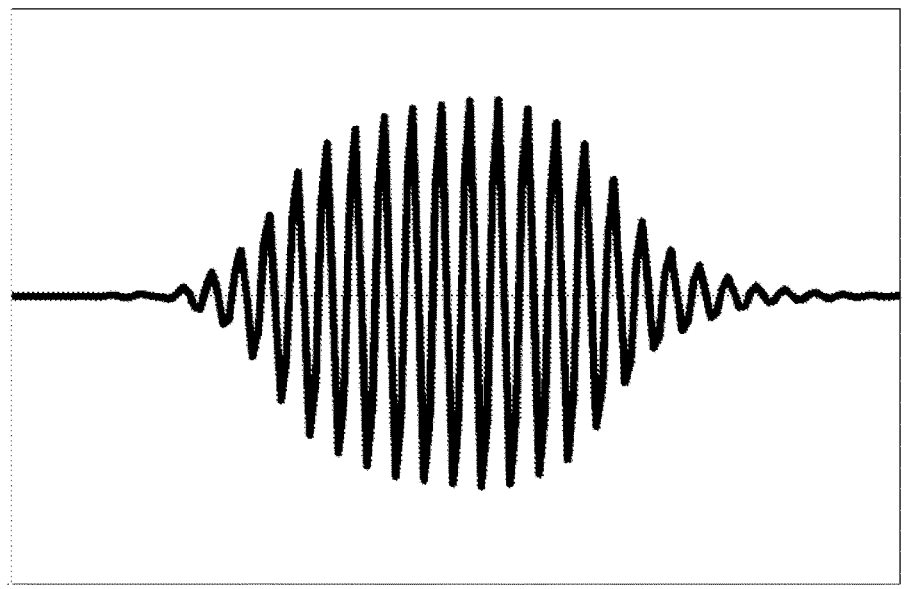
Figure 16B:
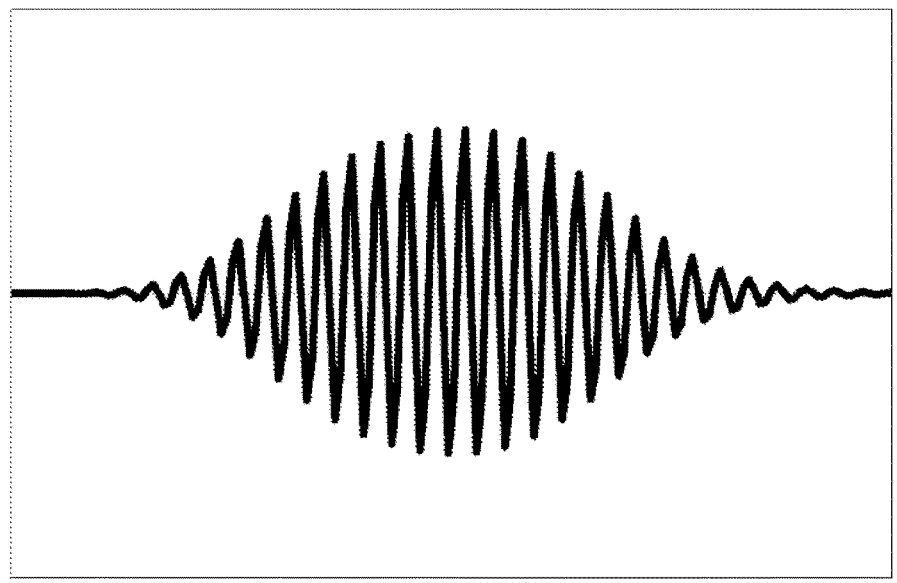

FIG. 16*a* illustrates the reconstruction of the signal of FIG. 15*a* using a wide band FIR reconstruction filter, whereas FIG. 16*b* illustrates the reconstruction of the same signal using a narrow band FIR reconstruction filter.

From comparing the reconstructed signals shown in FIGS. 16*a* and 16*b* to the original signal shown in FIG. 15*a*, it is clear that the use of a narrow band FIR reconstruction filter results in a more severe distortion of the signal than does the use of a wide band FIR reconstruction filter. The optimum band width of the FIR reconstruction filter to be used depends partly on the width of the individual aliases in the undersampled spectrum, partly on the amount of noise in the signal.

Figure 17:
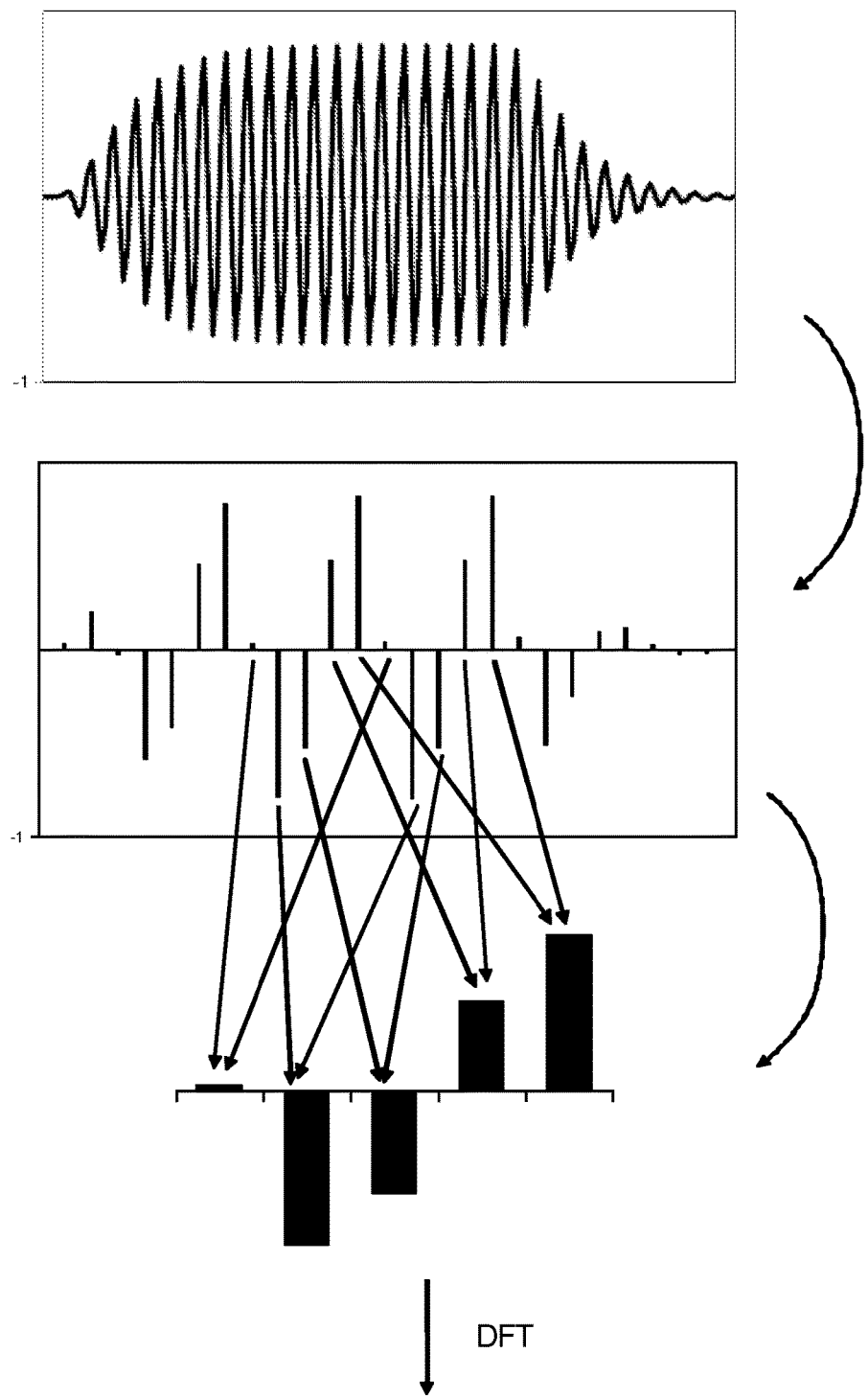

FIG. 17 illustrates schematically a method for finding the amplitude and phase of an undersampled continuous signal without using any FIR reconstruction filter.

The upper half of FIG. 17 comprises two frames illustrating a continuous signal and the digital samples obtained by sampling this continuous signal at a sampling frequency of ⅚ of the signal frequency, respectively.

The relation between the signal frequency and the sampling frequency means that for each sixth oscillations of the continuous signal, five samples will be collected. If the continuous signal is stationary, the five samples from a period of six oscillations will correspond exactly to the five samples from the previous six oscillations and to the five samples from the following six oscillations.

If a relatively long input signal is used, the midmost part of the signal can be considered to be substantially stationary as indicated in the upper half of FIG. 17, and the samples obtained from this part of the signal can be sorted out and summed up in five groups, each containing a number of "similar" samples from different periods of six oscillations of the continuous signal as illustrated in the lower half of FIG. 17.

If this sorting and summing up of samples is done in an appropriate way, these five groups of samples together form an "average sampling" of a single oscillation, which corresponds to a single oscillation of the substantially stationary part of the continuous signal and from which the amplitude and phase of the continuous signal can be determined by means of Digital Fourier Transformation DFT.

As mentioned above, the difference between the transit times of two different ultrasonic signals, corresponding to the quantity $(t_1-t_2)$ in Equation 1, can easily be found by comparing the phases of the corresponding two electrical reception signals received by the receiver circuit RC of the flow meter. Thus, in order to find this difference in a system using undersampling, the transmission signals should advantageously be relatively long, assuring that there is enough information in the samples from the substantially stationary part of the signal to determine the phase of the signal with a sufficient accuracy.

Figure 18:
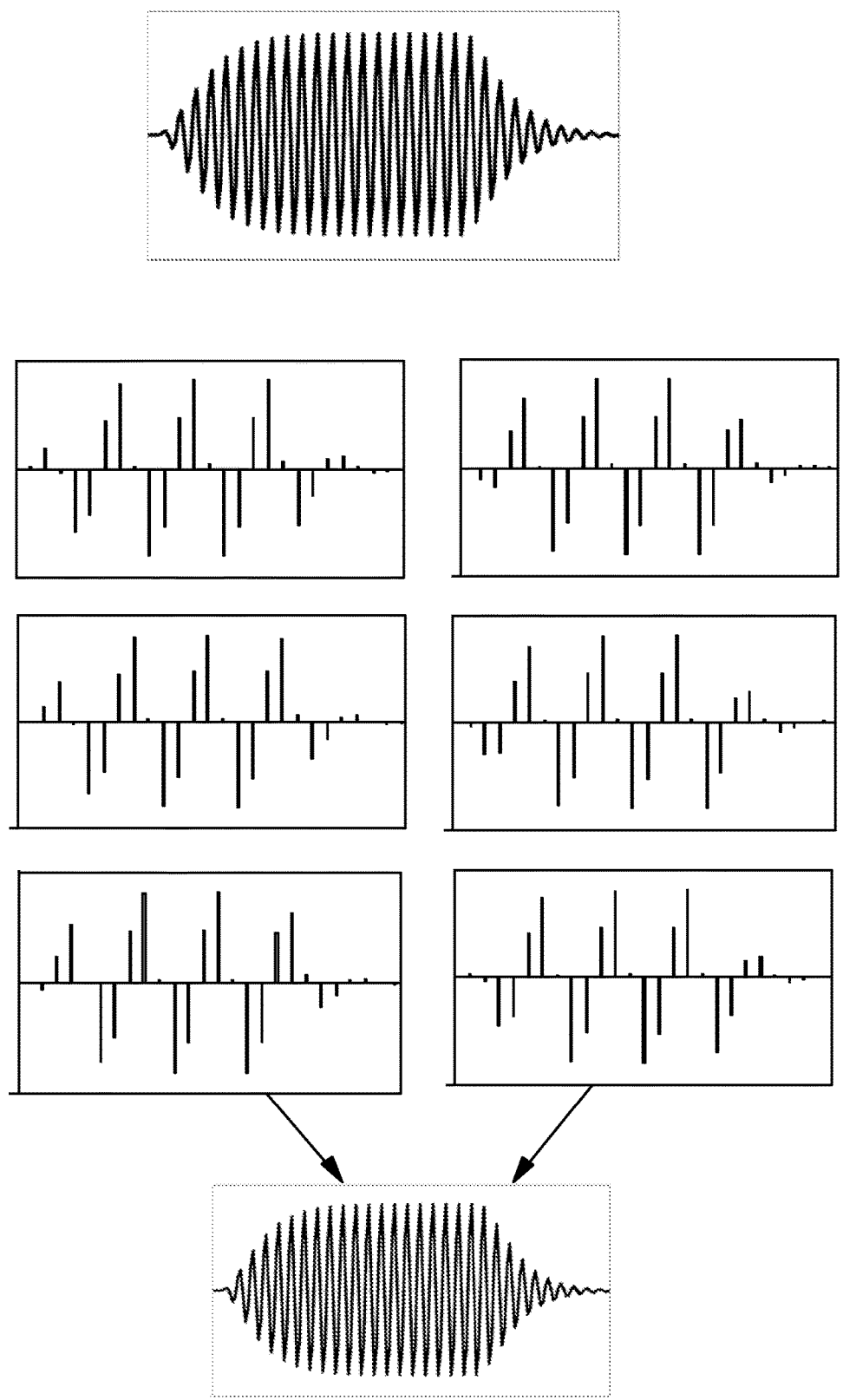

FIG. 18 illustrates schematically a method for reconstructing an undersampled continuous signal without distortion.

Again, the continuous signal, which is shown in the top of FIG. 18, is sampled with an analogue-digital converter working at a sampling frequency of 5/6 of the signal frequency. However, in this method, the signal is transmitted and sampled six times, the timing of the sampling being displaced corresponding to 1/5 of the oscillation period of the continuous signal, the resulting six sets of interleaved samples from which samplings are illustrated schematically in the central part of FIG. 18.

By combining the interleaved samples appropriately, samples corresponding to a sampling frequency of 5 times the signal frequency are obtained. Only two times the signal frequency needed (according to the Nyquist theorem), this is more than sufficient to reconstruct the signal without any distortion.

In order to determine precise values of the absolute transit times $t_1$ and $t_2$ to be added together to find the quantity $(t_1+t_2)$ in Equation 1, the transmission signals should advantageously be relatively sharp, short and well-defined.

Figure 19:
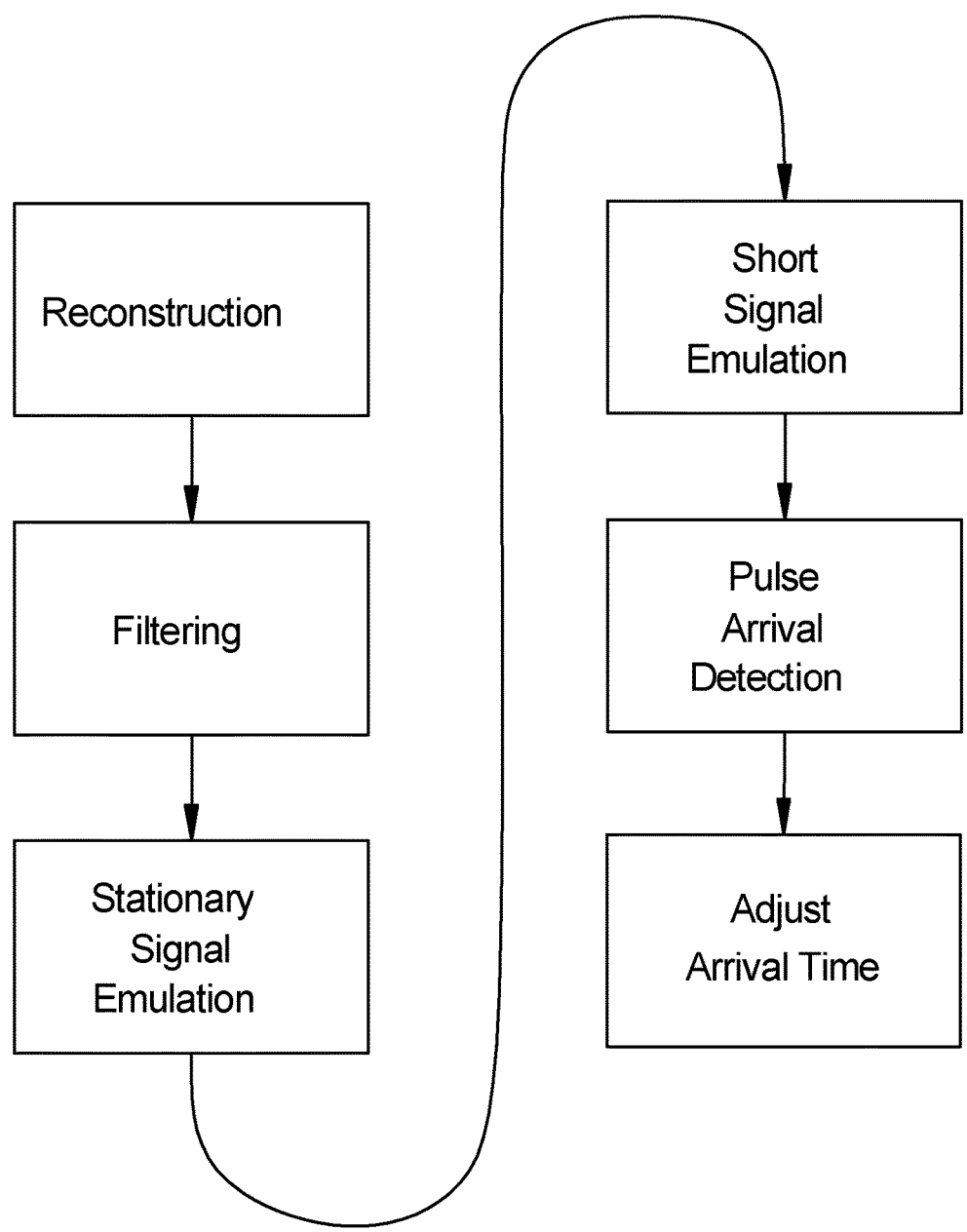

Taking the above consideration into account, the digital signal processing on the physical and simulated model responses of a flow meter according to the invention in order to obtain a very precise value of the absolute transit time may be performed as illustrated schematically in FIG. 19.

First, if the signal is undersampled, upsampling and anti-alias filtering is performed in order to reconstruct the signal.

After that, an optional filtering including bandwidth limitation may be performed in order to improve the signal-noise ratio of the signal.

The relatively sharp, short and well-defined transmission signal, which is advantageous for obtaining a very precise absolute transit time determination, cf. the above, is emulated from the actual received and filtered signal in two steps:

The first emulation step consists in obtaining an emulated substantially stationary signal by adding to the received signal delayed versions of the signal itself. If, for instance, the transmitted signal contains five oscillations, versions of the received and filtered signal, which are delayed by five, ten, fifteen, etc. periods of the signal are added to the actually received and filtered signal. Due to the complete linearity of the system, the principle of superposition assures that the resulting signal is exactly similar to the filtered version of the signal that would have been received if the transmission signal had contained ten, fifteen, twenty, etc. oscillation periods.

The second emulation step consists in subtracting a delayed version of the emulated substantially stationary signal from the emulated substantially stationary signal itself. If, for instance, the subtracted signal is delayed by two periods of the signal, the principle of superposition assures that the resulting signal is exactly similar to the filtered version of the signal that would have been received if the transmission signal had contained two oscillation periods. If this subtraction had been done with two versions of the original received and filtered signal corresponding to a transmission signal containing only five oscillation periods, the resulting signal would be a signal corresponding to a transmitted signal having two pulses followed by a pause of three oscillation periods and then by another two pulses opposite in phase from the first two pulses. Obviously, such an odd signal would not be very suitable for the purpose.

Now, the envelope of the emulated short signal is calculated and the point of time, on which 50% of the maximum value of the envelope has been reached, is found as illustrated in FIG. 13.

Finally, the absolute transit time is determined by subtracting the corresponding point of time relating to the envelope of the simulation model response signal calculated from the transducer characteristics as described above.

Figure 20A:
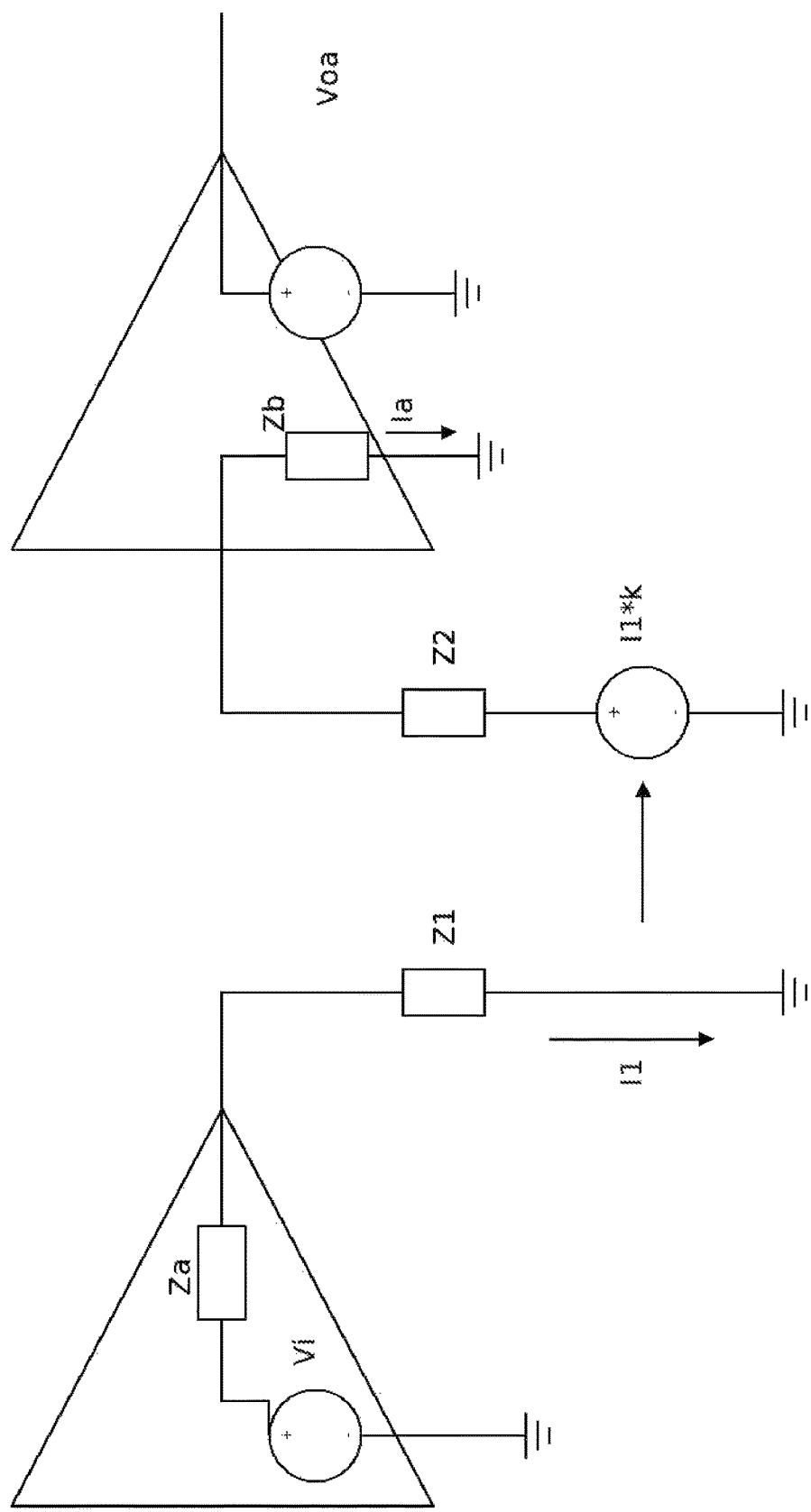
Figure 20B:
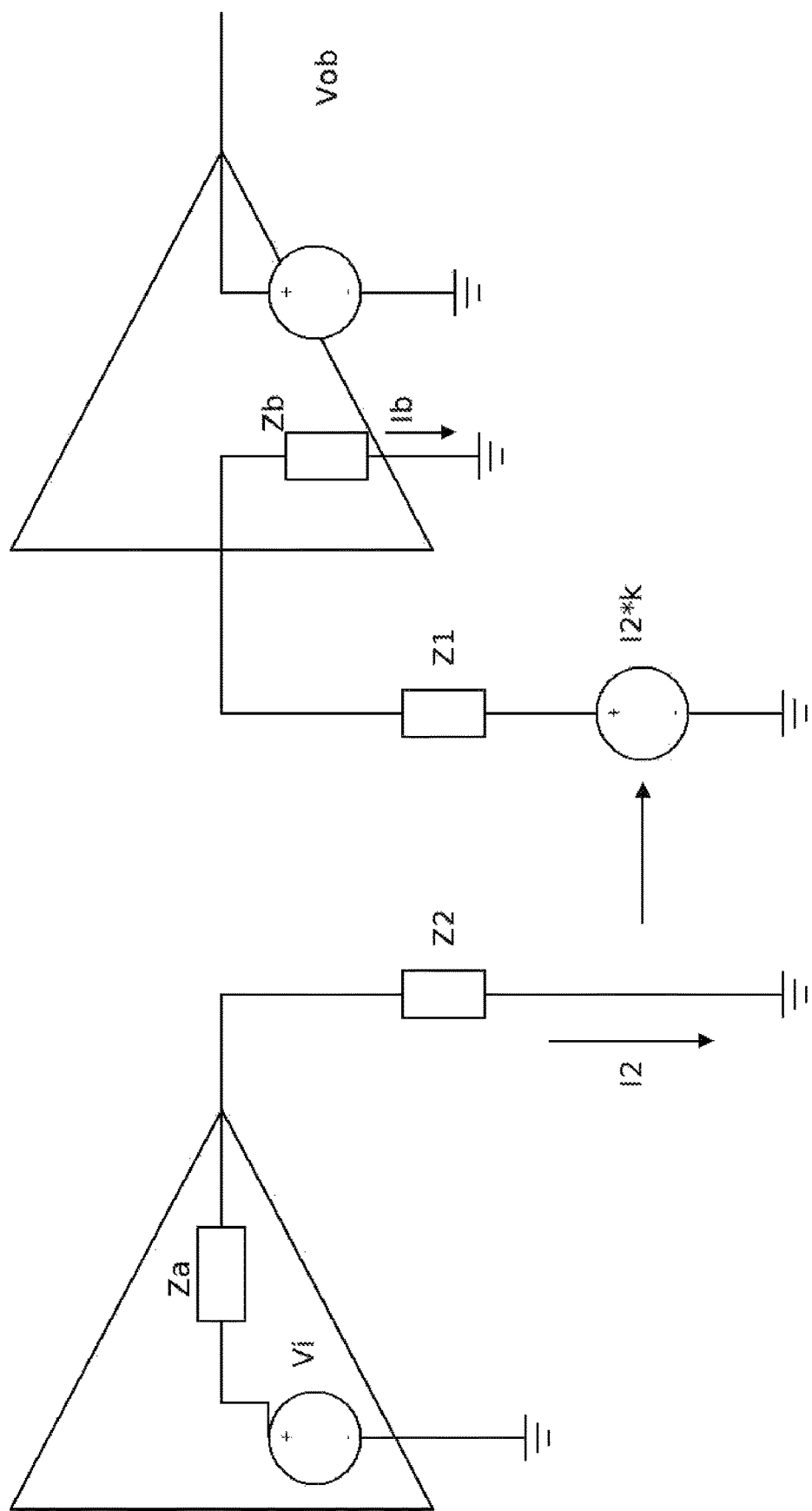

FIGS. 20a and 20b illustrate schematic diagrams of the electrical currents running in an ultrasonic flow meter according to an embodiment of the invention, when an ultrasonic signal is transmitted in a first signal direction from a first ultrasonic transducer to a second ultrasonic transducer, and in a second signal direction from the second ultrasonic transducer to the first ultrasonic transducer, respectively.

According to these schematic diagrams, the relations between the voltages, currents and impedances in the system are relatively simple as indicated in Equation 8 below. It should be noted that these quantities are all represented by complex values in the discussion here below.

The output voltage $V_{oa}$, $V_{ob}$ from the receiver circuit is determined by the input current signal $I_a$, $I_b$ for the receiver circuit and the amplification factor A of the receiving circuit.

The input current signal $I_a$, $I_b$ for the receiver circuit is determined by the voltage impressed on the receiving transducer, the input impedance $Z_b$ of the receiver circuit and the transducer impedance $Z_1$, $Z_2$ of the receiving transducer.

The voltage impressed on the receiving transducer is proportional to the current $I_1$, $I_2$ through the transmitting transducer, the proportionality factor k being dependent on the characteristics of the two transducers.

The current $I_1$, $I_2$ through the transmitting transducer is determined by the input signal V, for the signal generator, the output impedance $Z_a$ of the signal generator and the transducer impedance $Z_1$, $Z_2$ of the transmitting transducer.

$$V_{ob} = A * I_b \wedge V_{oa} = A * I_a \wedge \qquad \text{(Equation 8)}$$
$$I_a = \frac{I_1 * k}{(Z_2 + Z_b)} \wedge I_b = \frac{I_2 * k}{(Z_1 + Z_b)} \wedge$$
$$I_1 = \frac{V_i}{(Z_a + Z_1)} \wedge I_2 = \frac{V_i}{(Z_a + Z_2)}$$

If the output impedance $Z_a$ of the signal generator does not exactly match the input impedance $Z_b$ of the receiver circuit or the two transducer impedances $Z_1$, $Z_2$ are not exactly the same, the reciprocity theorem for linear passive circuits does not fully apply for the flow meter. This may result in a phase error causing a difference between the transmission times for the ultrasonic signal travelling in the two opposite directions even though there is no flow to be measured by the flow meter.

This phase error, however, can be compensated for, if the four impedances $Z_1$, $Z_2$, $Z_a$ and $Z_2$ are known. The mathematical reasoning behind this fact is rather complicated but can, as is shown below, be reduced substantially so that, in practice, the phase error compensation can be implemented be relatively simple means.

Remembering that the input current signals $I_a$, $I_b$ for the receiver circuit are complex values, the phase error can be defined by means of the argument function Arg as follows:

$$\text{phase error} = \text{Arg}(I_b) - \text{Arg}(I_a) = \text{Arg}\left(\frac{I_b}{I_a}\right) \qquad \text{(Equation 9)}$$

Now, taking into account the relations of Equation 8, the ratio $I_b/I_a$ can be expressed as:

$$\frac{I_b}{I_a} = \frac{(Z_a + Z_1)*(Z_b + Z_2)}{(Z_a + Z_2)*(Z_b + Z_1)} = \frac{\left(1 + \frac{Z_1}{Z_a}\right)*\left(1 + \frac{Z_2}{Z_b}\right)}{\left(1 + \frac{Z_2}{Z_a}\right)*\left(1 + \frac{Z_1}{Z_b}\right)} \qquad \text{(Equation 10)}$$

If a signal generator with very low output impedance $Z_a$ is used, $$\left|\frac{Z_1}{Z_a}\right| \gg 1 \wedge \left|\frac{Z_2}{Z_a}\right| \gg 1 \qquad \text{(Equation 11)}$$

and Equation 10 may be reduced to $$\frac{I_b}{I_a} \approx \frac{\frac{Z_1}{Z_a}\left(1 + \frac{Z_2}{Z_b}\right)}{\frac{Z_2}{Z_a}\left(1 + \frac{Z_1}{Z_b}\right)} = \frac{1/Z_2 + 1/Z_b}{1/Z_1 + 1/Z_b} = \frac{Z_b/Z_2 + 1}{Z_b/Z_1 + 1} \qquad \text{(Equation 12)}$$

Since it is more difficult to obtain an input impedance $Z_b$ of the receiver circuit, which is as low as the very low output impedance $Z_a$ of the signal generator, a similar approximation cannot be made for $Z_1/Z_b$ and $Z_2/Z_b$.

Combining Equations 9 and 12, the phase error may now be expressed as:

$$\text{phase error} = \text{Arg}(I_b) - \text{Arg}(I_a) \approx \text{Arg}\left(\frac{Z_b/Z_2 + 1}{Z_b/Z_1 + 1}\right) \qquad \text{(Equation 13)}$$

Letting the operators $\Re$ and $\Im$ represent the real and imaginary parts, respectively, of a complex value, and arctan represent the arc tangent function, Equation 13 may be developed as follows:

$$\text{phase error} = \text{Arg}(I_b) - \text{Arg}(I_a) \qquad \text{(Equation 14)}$$
$$\approx \text{Arg}\left(\frac{Z_b/Z_2 + 1}{Z_b/Z_1 + 1}\right)$$
$$= \text{Arg}(Z_b/Z_2 + 1) - \text{Arg}(Z_b/Z_1 + 1)$$
$$= \arctan\left(\frac{\Im(Z_b/Z_2 + 1)}{\Re(Z_b/Z_2 + 1)}\right) -$$
$$\arctan\left(\frac{\Im(Z_b/Z_1 + 1)}{\Re(Z_b/Z_1 + 1)}\right)$$

For a low impedance input receiver $|Z_b| < |Z_1|$ and $|Z_b| < |Z_2|$, meaning that:

$$\Im(Z_b/Z_2 + 1) = \Im(Z_b/Z_2) \wedge \Re(Z_b/Z_2 + 1) \approx 1 \qquad \text{(Equation 15)}$$
$$\wedge$$
$$\Im(Z_b/Z_1 + 1) = \Im(Z_b/Z_1) \wedge \Re(Z_b/Z_1 + 1) \approx 1$$

Thus, $$\text{Arg}(I_b) - \text{Arg}(I_a) \approx \arctan\left(\frac{\Im(Z_b/Z_2)}{1}\right) - \qquad \text{(Equation 16)}$$
$$\arctan\left(\frac{\Im(Z_b/Z_1)}{1}\right)$$
$$= \arctan(\Im(Z_b/Z_2)) -$$
$$\arctan(\Im(Z_b/Z_1))$$

Since $|Z_b| < |Z_1|$ and $|Z_b| < |Z_2|$, and $\arctan(x) \approx x$ for small values of x:

$$\text{Arg}(I_b) - \text{Arg}(I_a) \approx \Im\left(\frac{Z_b}{Z_2}\right) - \Im\left(\frac{Z_b}{Z_1}\right) \qquad \text{(Equation 17)}$$
$$= \Im\left(\frac{Z_b}{Z_2} - \frac{Z_b}{Z_1}\right)$$

In a practical system, $Z_1$ and $Z_2$ are measured indirectly by detecting signals proportional to the output current from the signal generator during transmission, i.e.

$$Z_1 = V_i/I_1 = V_i/(k_2 I_1') \wedge Z_2 = V_i/I_2 = V_i/(k_2 I_2') \qquad \text{(Equation 18)}$$

$I_1'$ and $I_2'$ are the proportional signals, which can be detected by measuring the power supply currents to the active component of the signal generator as described above. $k_2$ is a proportionality constant corresponding to the amplification factor between the true signals $I_1$ respectively $I_2$ on one side and the detected signals $I_1'$ respectively $I_2'$ on the other side.

Inserting Equation 18 into Equation 17 results in the following $$\text{Arg}(I_b) - \text{Arg}(I_a) \approx \Im(Z_b/Z_2 - Z_b/Z_1) \quad \text{(Equation 19)}$$

$$= \Im\left(Z_b\left(\frac{k_2 I_2'}{V_i} - \frac{k_2 I_1'}{V_i}\right)\right)$$

$$= \Im\left(\frac{Z_b k_2}{V_i}(I_2' - I_1')\right)$$

$V_i$ can be assumed to be constant as long as $Z_a$ is very low. Therefore, $(Z_b k_2/V_i)$ can be assumed to be a complex value constant C at the frequency of interest, and Equation 19 can be reduced to:

$$\text{Arg}(I_b) - \text{Arg}(I_a) \approx \Im(C) * \Re(I_2' - I_1') + \Re(C) * \Im(I_2' - I_1') \quad \text{(Equation 20)}$$

In a practical system, a fixed phase error might also be introduced in the system due to non-idealities in the electronic system, such as asymmetry on a PCB or couplings between the two transducers. For this reason, it is beneficial to introduce a new constant C3 that takes that into account, and the phase error equation ends up having the following form:

$$\text{phase error} = \text{Arg}(I_b) - \text{Arg}(I_a) \approx \Im(C) * \Re(I_2' - I_1') + \Re(C) * \Im(I_2' - I_1') + C3 \quad \text{(Equation 21)}$$

C and C3 depend on the electronic circuit and must be determined by fitting measured data to the equation by observing the phase errors and proportional signal obtained at several different temperatures and optimizing the values of C and C3 until the estimation of the phase error using Equation 21 results in the best possible estimate of the measures phase error at all temperatures.

Once C and C3 have been determined, regular detection of the proportional signals $I_1'$ and $I_2'$ in order to take into account the ongoing changes in the values of $Z_1$ and $Z_2$ may be used to implement and continuously adjust a phase error correction system into the ultrasonic flow meter in accordance with Equation 21. Experiments have shown that, if appropriately adjusted, such a phase error correction system is able to reduce the phase error at least by a factor of 10 (from approximately 100 ps to about 10 ps).

The two constants C and C3 may be assumed to be similar from one ultrasonic flow meter to another, as long as $Z_a$ and $Z_b$ are approximately equal in every flow meter.

Figure 20C:
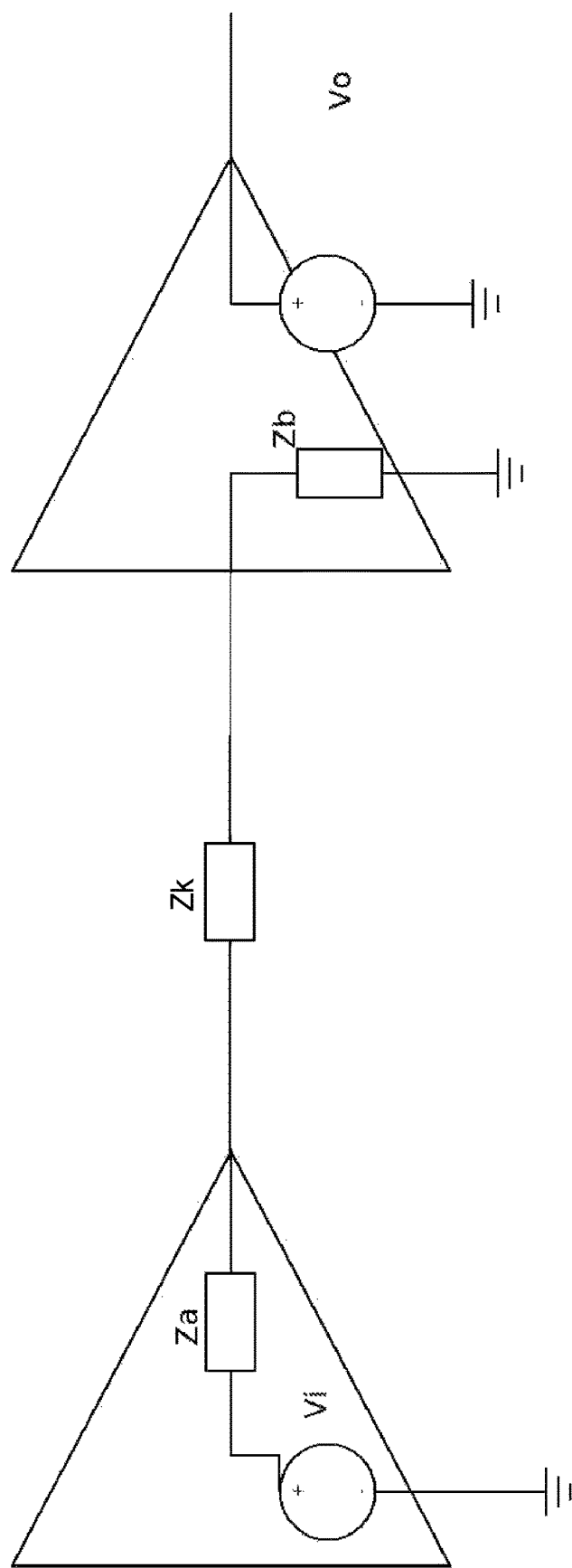

In some embodiments, C will not be completely constant over temperature, operating voltage, electronic component parameters, etc. The most important parameter here is $Z_b$. Changes in $Z_b$ may be detected by adding a signal path directly from the signal generator to the receiver circuit via a constant impedance $Z_k$ as illustrated in FIG. 20c.

When transmitting a signal directly (i.e. bypassing the ultrasonic transducers) from the transmitter to the receiver through $Z_k$, the output voltage $V_o$ of the receiver will depend on the impedance $Z_b$:

$$V_o = Z_b/Z_k * V_i \quad \text{(Equation 22)}$$

as long as Zb>>Za.

$Z_b$ is inversely proportional to the amplification factor A of the receiver circuit. Thus, variations in A influence the accuracy of the phase error correction. However, for any given batch of operational amplifiers, the amplification A will be very constant for all the amplifiers, and $Z_b$ and C can be assumed to have the same values for all ultrasonic meters using operational amplifiers from that batch.

It should be noted that the scope of the invention is in no way to be understood as being limited to the above-described embodiments of the invention, which are only to be seen as examples of a multitude of embodiments falling within the scope of the invention as defined by the below patent claims.

LIST OF REFERENCE SYMBOLS

CC. Common conductor for signal generator and receiver circuit
Cpar. Parallel capacitor in equivalence diagram for ultrasonic transducer
Cpar1. Parallel capacitor in equivalence diagram for first ultrasonic transducer
Cpar2. Parallel capacitor in equivalence diagram for second ultrasonic transducer
Cser. Series capacitor in equivalence diagram for ultrasonic transducer
Cser1. Series capacitor in equivalence diagram for first ultrasonic transducer
Cser2. Series capacitor in equivalence diagram for second ultrasonic transducer
DFT. Digital Fourier Transformation
DPSa. First digital pulsating input signal
DPSb. Second digital pulsating input signal
Escs. Envelope of supply current signal
fs. Undersampling frequency
$fs_2$. Nyquist sampling frequency
I1. Current through transmitting transducer first signal direction
I2. Current through transmitting transducer second signal direction
Ia. Input signal current for receiver circuit first signal direction
Ib. Input signal current for receiver circuit second signal direction
Itr1. Current through first transducer in equivalence diagram
Itr2. Current through second transducer in equivalence diagram
k. Proportionality factor between current through the transmitting transducer and the voltage impressed on the receiving transducer
Lser. Series inductor in equivalence diagram for ultrasonic transducer
Lser1. Series inductor in equivalence diagram for first ultrasonic transducer
Lser2. Series inductor in equivalence diagram for second ultrasonic transducer
OP. Operational amplifier common for signal generator and receiver circuit
OPrc. Operational amplifier in receiver circuit
OPrc1. Operational amplifier in first receiver circuit
OPrc2. Operational amplifier in second receiver circuit
OPsg. Operational amplifier in signal generator
RC. Receiver circuit
RCC. Current sensing resistor for power supply current
Rser. Series resistor in equivalence diagram for ultrasonic transducer
Rser1. Series resistor in equivalence diagram for first ultrasonic transducer
Rser2. Series resistor in equivalence diagram for second ultrasonic transducer
SCSa. First half of supply current signal
SCSb. Second half of supply current signal
SCS−. Subtraction supply current signal
SCS+. Addition supply current signal
SG. Signal generator
SU. Switching unit
SW1. First switch SW2. Second switch
$t_d$. Time delay of ultrasonic signal in flow path
Tscs. Oscillation period of supply current signal
TR1. First ultrasonic transducer
TR2. Second ultrasonic transducer
TR. Ultrasonic transducer
VCC. Positive power supply voltage
Vi. Input signal for signal generator
Vo. Output signal from receiver circuit
Voa. Output signal from receiver circuit first signal direction
Vob. Output signal from receiver circuit second signal direction
Vtr1. Voltage impressed on first transducer in equivalence diagram
Vtr2. Voltage impressed on second transducer in equivalence diagram
Z1. Transducer impedance first transducer
Z2. Transducer impedance second transducer
Za. Output impedance of signal generator
Zad. Adaptation impedance
Zb. Input impedance of receiver circuit
Zfb. Feedback impedance in combined signal generator and receiver circuit
Zfb,rc. Feedback impedance in receiver circuit
Zfb,rc1. Feedback impedance in first receiver circuit
Zfb,rc2. Feedback impedance in second receiver circuit
Zfb,sg. Feedback impedance in signal generator
Zfilt. Filter impedance
Zk. Constant impedance used for test purposes
Zsig. Signal impedance
$\alpha_1$. Damping coefficient relating to first ultrasonic transducer
$\alpha_2$. Damping coefficient relating to second ultrasonic transducer
$\omega_1$. Undampened angular oscillation frequency of first ultrasonic transducer
$\omega_2$. Undampened angular oscillation frequency of second ultrasonic transducer
$\omega_{D1}$. Dampened angular oscillation frequency of first ultrasonic transducer
$\omega_{D2}$. Dampened angular oscillation frequency of second ultrasonic transducer

The invention claimed is:

1. A method of reducing a phase error of a flow rate measurement in an ultrasonic flow meter having a flow path for a fluid to be measured, a signal generator, a first ultrasonic transducer having a first impedance and a second ultrasonic transducer having a second impedance being different from the first impedance, the phase error occurring due to the difference of the first impedance and the second impedance, said method comprising the steps of:

measuring a first power supply current to an active component of the signal generator connected to the first ultrasonic transducer when an ultrasonic signal is transmitted in the flow path in a first direction between the two ultrasonic transducers, the measured first power supply current being related to the first impedance;

measuring a second power supply current to an active component of the signal generator connected to the second ultrasonic transducer when an ultrasonic signal is transmitted in the flow path in a second direction between the two ultrasonic transducers, the measured second power supply current being related to the second impedance;

determining a relation between the measured first power supply current and the measured second power supply current;

estimating a phase error value indicative of said phase error from the determined relation between the measured first power supply current and the measured second power supply current;

correcting transmission times measured by the ultrasonic flow meter based on the estimated phase error value; and providing an output indicative of the flow rate of the fluid in the flow path with reduced phase error on the basis of the corrected transmission times.

2. The method according to claim 1, wherein the determining a relation between the measured first power supply current and the measured second power supply current comprises determining a difference between the measured first power supply current and the measured second power supply current.

3. The method according to claim 1, wherein the estimating the estimated phase error value comprises applying a proportionality factor to the difference between the measured first power supply current and the measured second power supply current.

4. The method according to claim 1, wherein the correcting transmission times based on the estimated phase error value, comprises subtracting the estimated phase error value from a difference between transmission times of ultrasonic signals in opposite directions between the first ultrasonic transducer and the second ultrasonic transducer measured by the ultrasonic flow meter.

5. The method according to claim 1, wherein the estimation of the estimated phase error value includes a use of one or more phase error correction constants.

6. The method according to claim 1, wherein the estimated phase error value is calculated from the expression $$\Im(C)*\Re(I_2'-I_1')+\Re(C)*\Im(I_2'-I_1')+C3,$$

wherein $I_1'$ is the measured first power supply current, $I_2'$ is the measured second power supply current, $\Re$ and $\Im$ are operators representing real and imaginary parts, respectively, of a complex value, and C and C3 are complex value phase error correction constants.

7. The method according to claim 6, wherein the complex value phase error correction constant C is based on a proportionality factor.

8. The method according to claim 5, wherein the one or more phase error correction constants are determined and optimized to result in a best possible estimated phase error values over a large range of temperatures through a series of measurements of actual phase errors in an ultrasonic flow meter so that the one or more phase error correction constants may be considered independent of temperature when calculating the estimated phase error value.

9. The method according to claim 1, further comprising the steps of regularly repeating the measurement of the first and second power supply currents and updating the estimation of the estimated phase error value accordingly.

10. A method for determining an absolute transit time of an ultrasonic signal in a flow path of an ultrasonic flow meter having a signal generator, and a first ultrasonic transducer having a first impedance and a second ultrasonic transducer having a second impedance being different from the first impedance, the phase error occurring due to the difference of the first impedance and the second impedance, said method comprising the steps of:

monitoring a current to an active component of a signal generator driving a transducer from one or more voltage supplies during and after a feeding of an input signal to the signal generator, thus obtaining a supply current signal for the transducer;

emulating a flow meter response similar to an output signal from a receiver circuit of the flow meter as the output signal would be, if there was no time delay in a transmission of an ultrasonic signal between the two ultrasonic transducers;

comparing the emulated flow meter response to a measured flow meter response actually received by the receiver circuit; and calculating the absolute transit time as a time difference between the emulated flow meter response and the measured flow meter response;

the method further including reducing a phase error in the calculated absolute transit time by the steps of:

measuring a first power supply current to an active component of the signal generator connected to the first ultrasonic transducer when an ultrasonic signal is transmitted in the flow path in a first direction between the two ultrasonic transducers, the measured first power supply current being related to the first impedance;

measuring a second power supply current to an active component of the signal generator connected to the second ultrasonic transducer when an ultrasonic signal is transmitted in the flow path in a second direction between the two ultrasonic transducers, the measured second power supply current being related to the second impedance;

determining a relation between the measured first power supply current and the measured second power supply current;

estimating a phase error value indicative of said phase error from the determined relation between the measured first power supply current and the measured second power supply current; and correcting the absolute transit times measured by the ultrasonic flow meter based on the estimated phase error value.

11. The method according to claim 10, wherein the determining a relation between the measured first power supply current and the measured second power supply current comprises determining a difference between the measured first power supply current and the measured second power supply current.

12. The method according to claim 10, wherein the correcting the absolute transit times based on the estimated phase error value, comprises subtracting the estimated phase error value from a difference between transmission times of ultrasonic signals in opposite directions between the first ultrasonic transducer and the second ultrasonic transducer measured by the ultrasonic flow meter.

13. The method according to claim 10, further comprising the steps of regularly repeating the measurement of the first and second power supply currents and updating the calculation of the estimated phase error value accordingly.

14. A method for determining a time delay of an ultrasonic signal in a flow path of an ultrasonic flow meter having a signal generator, and a first ultrasonic transducer having a first impedance and a second ultrasonic transducer having a second impedance being different from the first impedance, the phase error occurring due to the difference of the first impedance and the second impedance, said method comprising the steps of:

characterizing the first and second ultrasonic transducers by determining characteristic quantities, such as an angular frequency ωD and a damping coefficient α of dampened oscillations of the transducers;

using the determined characteristic quantities of the transducers for finding an equivalence model of the transducers and establishing a numerical simulation model of the transducers and one of
electronic circuits of a signal generator,
a receiver circuit of the flow meter, and
electronic circuits of a signal generator and a receiver circuit of the flow meter;

simulating the flow meter system by entering an input signal function or a sampled version of a physical transmission signal reaching a first transducer of the transducers into the numerical simulation model, thereby obtaining a simulation model response corresponding to an output signal from the receiver circuit as it would be according to the model, if there was no time delay in a transmission of an ultrasonic signal between the two transducers, recording a physical flow meter response actually received by the receiver circuit, and calculating an absolute transit time by determining a time delay of the physical flow meter response as compared to the simulation model response;

the method further including reducing a phase error in the calculated absolute transit time by the steps of:

measuring a first power supply current to an active component of the signal generator connected to the first ultrasonic transducer when an ultrasonic signal is transmitted in the flow path in a first direction between the two ultrasonic transducers, the measured first power supply current being related to the first impedance;

measuring a second power supply current to an active component of the signal generator connected to the second ultrasonic transducer when an ultrasonic signal is transmitted in the flow path in a second direction between the two ultrasonic transducers, the measured second power supply current being related to the second impedance;

determining a relation between the measured first power supply current and the measured second power supply current;

estimating a phase error value indicative of said phase error from the determined relation between the measured first power supply current and the measured second power supply current; and correcting the absolute transit times calculated by the ultrasonic flow meter based on the estimated phase error value.

15. The method according to claim 14, wherein the determining a relation between the measured first power supply current and the measured second power supply current comprises determining a difference between the measured first power supply current and the measured second power supply current.

16. The method according to claim 14, wherein the correcting the absolute transit times based on the estimated phase error value, comprises subtracting the estimated phase error value from a difference between transmission times of ultrasonic signals in opposite directions between the first ultrasonic transducer and the second ultrasonic transducer measured by the ultrasonic flow meter.

17. The method according to claim 14, further comprising the steps of regularly repeating the measurement of the first and second power supply currents and updating the calculation of the estimated phase error value accordingly.

18. An ultrasonic flow meter comprising
a flow path for a fluid;
a first ultrasonic transducer having a first impedance;
a second ultrasonic transducer having a second impedance being different from the first impedance;
a phase error occurring due to the difference of the first impedance and the second impedance;
a signal generator for generating electrical signals to the transducer, the signal generator comprising an active component,
a current measuring arrangement for measuring a first power supply current to an active component of the signal generator connected to the first ultrasonic transducer when an ultrasonic signal is transmitted in the flow path in a first direction between the two ultrasonic transducers and a second power supply current to an active component of the signal generator connected to the second ultrasonic transducer when an ultrasonic signal is transmitted in the flow path in a second direction between the two ultrasonic transducers;
a transmission time measuring arrangement for measuring transmission times between the two ultrasonic transducers; and
a signal processing unit for providing an output indicative of the flow rate in the flow path based on the measured transmission times;
the ultrasonic flow meter being arranged to reduce a phase error of the measured transmission times using programming instructions for:
measuring the first power supply current with the current measuring arrangement, the measured first power supply current being related to the first impedance;
measuring the second power supply current with the current measuring arrangement, the measured second power supply current being related to the second impedance;
determining a relation between the measured first power supply current and the measured second power supply current;
estimating a phase error value indicative of said phase error from the determined relation between the measured first power supply current and the measured second power supply current; and
correcting the measured transmission times based on the estimated phase error value.

19. The ultrasonic flow meter according to claim 18, wherein the determining a relation between the measured first power supply current and the measured second power supply current comprises determining a difference between the measured first power supply current and the measured second power supply current.

20. The ultrasonic flow meter according to claim 18, wherein the correcting the measured transmission times based on the estimated phase error value, comprises subtracting the estimated phase error value from a difference between transmission times of ultrasonic signals in opposite directions between the first ultrasonic transducer and the second ultrasonic transducer measured by the ultrasonic flow meter.

* * * * *